United States Patent
Dickie

(10) Patent No.: US 12,032,631 B2
(45) Date of Patent: Jul. 9, 2024

(54) SYSTEMS AND METHODS FOR DATAFLOW GRAPH OPTIMIZATION

(71) Applicant: Ab Initio Technology LLC, Lexington, MA (US)

(72) Inventor: Garth Allen Dickie, Framingham, MA (US)

(73) Assignee: Ab Initio Technology LLC, Lexington, MA (US)

(*) Notice: Subject to any disclaimer, the term of this patent is extended or adjusted under 35 U.S.C. 154(b) by 0 days.

(21) Appl. No.: 15/993,284

(22) Filed: May 30, 2018

(65) Prior Publication Data

US 2019/0370407 A1 Dec. 5, 2019

(51) Int. Cl.
*G06F 16/901* (2019.01)
*G06F 16/23* (2019.01)
*G06F 16/242* (2019.01)

(52) U.S. Cl.
CPC ...... *G06F 16/9024* (2019.01); *G06F 16/2379* (2019.01); *G06F 16/2433* (2019.01)

(58) Field of Classification Search
None
See application file for complete search history.

(56) References Cited

U.S. PATENT DOCUMENTS

| | | | |
|---|---|---|---|
| 5,918,255 A * | 6/1999 | Dutka | G01M 13/02 73/1.84 |
| 5,966,072 A | 10/1999 | Stanfill et al. | |
| 6,438,741 B1 * | 8/2002 | Al-omari | G06F 16/24542 707/694 |
| 7,047,232 B1 | 5/2006 | Serrano | |

(Continued)

FOREIGN PATENT DOCUMENTS

| | | |
|---|---|---|
| CN | 101443733 A | 5/2009 |
| CN | 103180826 A | 6/2013 |

(Continued)

OTHER PUBLICATIONS

International Search Report and Written Opinion for International Application No. PCT/US2019/033573 dated Jul. 26, 2019.

(Continued)

*Primary Examiner* — Yu Zhao
(74) *Attorney, Agent, or Firm* — Wolf, Greenfield & Sacks, P.C.

(57) ABSTRACT

At least one non-transitory computer-readable storage medium storing processor-executable instructions that, when executed by at least one computer hardware processor, cause the at least one computer hardware processor to perform: obtaining an automatically generated initial dataflow graph, the initial dataflow graph comprising a first plurality of nodes representing a first plurality of data processing operations and a first plurality of links representing flows of data among nodes in the first plurality of nodes; and generating an updated dataflow graph by iteratively applying dataflow graph optimization rules to update the initial dataflow graph, the updated dataflow graph comprising a second plurality of nodes representing a second plurality of data processing operations and a second plurality of links representing flows of data among nodes in the second plurality of nodes.

36 Claims, 19 Drawing Sheets

(56) References Cited

U.S. PATENT DOCUMENTS

| | | | |
|---|---|---|---|
| 7,716,630 | B2 | 5/2010 | Wholey et al. |
| 8,195,643 | B2 | 6/2012 | Weyerhaeuser et al. |
| 8,793,243 | B2 | 7/2014 | Weyerhaeuser et al. |
| 8,838,579 | B2 | 9/2014 | Weyerhaeuser et al. |
| 9,116,955 | B2 | 8/2015 | Schechter et al. |
| 9,208,141 | B2 | 12/2015 | Chan et al. |
| 9,798,527 | B1 | 10/2017 | Bendersky et al. |
| 10,528,599 | B1* | 1/2020 | Pandis ............... G06F 16/248 |
| 10,817,495 | B2 | 10/2020 | Dickie |
| 11,188,434 | B2 | 11/2021 | Allin et al. |
| 2003/0163512 | A1 | 8/2003 | Mikamo |
| 2003/0176993 | A1* | 9/2003 | Lines ................. G06F 11/261 703/22 |
| 2004/0220942 | A1 | 11/2004 | Agrawal et al. |
| 2004/0250098 | A1 | 12/2004 | Licis |
| 2005/0034112 | A1 | 2/2005 | Stanfill |
| 2006/0095406 | A1 | 5/2006 | Bestgen et al. |
| 2007/0271381 | A1 | 11/2007 | Wholey et al. |
| 2008/0140622 | A1 | 6/2008 | Bestgen et al. |
| 2009/0077013 | A1 | 3/2009 | Hu et al. |
| 2011/0055426 | A1 | 3/2011 | Lakshmanan et al. |
| 2011/0197122 | A1 | 8/2011 | Chan et al. |
| 2012/0089595 | A1 | 4/2012 | Jaecksch |
| 2012/0284255 | A1* | 11/2012 | Schechter ......... G06F 16/24526 707/718 |
| 2013/0290297 | A1 | 10/2013 | Weyerhaeuser et al. |
| 2013/0290298 | A1* | 10/2013 | Weyerhaeuser .. G06F 16/24542 707/719 |
| 2014/0033173 | A1 | 1/2014 | Frenkiel |
| 2015/0088856 | A1* | 3/2015 | Hunter .............. G06F 16/24544 707/714 |
| 2015/0106818 | A1 | 4/2015 | Atterbury et al. |
| 2016/0154896 | A1* | 6/2016 | Simitsis .............. G06F 16/2372 707/741 |
| 2016/0371067 | A1 | 12/2016 | Absar et al. |
| 2017/0039245 | A1 | 2/2017 | Wholey, III et al. |
| 2017/0083573 | A1* | 3/2017 | Rogers ................ G06F 16/9535 |
| 2017/0147644 | A1* | 5/2017 | Lee ......................... G06F 16/00 |
| 2017/0308411 | A1* | 10/2017 | Brill ....................... G06F 9/5044 |
| 2018/0113905 | A1* | 4/2018 | Goerzig ............. G06F 21/6218 |
| 2018/0285401 | A1 | 10/2018 | Dickie |
| 2019/0179723 | A1 | 6/2019 | Allin et al. |
| 2021/0182263 | A1 | 6/2021 | Dickie |
| 2023/0093911 | A1 | 3/2023 | Dickie |

FOREIGN PATENT DOCUMENTS

| | | |
|---|---|---|
| CN | 103699515 A | 4/2014 |
| CN | 103713958 A | 4/2014 |
| CN | 105518676 A | 4/2016 |
| EP | 2657860 A1 | 10/2013 |
| JP | H06-161773 A | 6/1994 |
| JP | 2001-222452 A | 8/2001 |
| JP | 2003-529808 A | 10/2003 |
| JP | 2005-018767 A | 1/2005 |
| JP | 2005-309684 A | 11/2005 |
| JP | 2014-519080 A | 8/2014 |
| JP | 2015-045996 A | 3/2015 |
| KR | 10-2012-0106827 A | 9/2012 |
| KR | 10-2013-0130706 A | 12/2013 |
| KR | 10-2014-0014123 A | 2/2014 |
| WO | WO 2012/151149 A2 | 11/2012 |
| WO | WO 2014/209260 A1 | 12/2014 |
| WO | WO 2016/078072 A1 | 5/2016 |
| WO | WO 2016/116132 A1 | 7/2016 |
| WO | WO 2017/024164 A1 | 2/2017 |
| WO | WO 2017/048303 A1 | 3/2017 |

OTHER PUBLICATIONS

International Search Report and Written Opinion for International Application No. PCT/US2018/025144 dated Jun. 21, 2018.

International Search Report and Written Opinion for International Application No. PCT/US2018/064217 dated Mar. 13, 2019.

[No Author Listed], ApexSQL Plan 2017—Screen Shot Tour. Jun. 25, 2017. Retrieved from the Internet: https://web.archive.org/web/20170625041627/https://blog.apexsql.com/apexsql-plan-2017-screen-shot-tour/ [retrieved on Feb. 27, 2019] 18 pages.

[No Author Listed], Using Oracle Database Cloud Service Viewing Real Time SQL Monitor. Oracle Database Cloud Service. Help Center. 2016. 3 pages.

Farina, SQL Server 2014 Real Time Query Monitoring. Zero to Hero: 12 Tips for the Accidental DBA. Last update Sep. 9, 2014; 7 pages.

Koltakov, Real-Time SQL Monitoring. Oracle. Dec. 2009; 30 pages.

U.S. Appl. No. 15/939,820, filed Mar. 29, 2018, Dickie.

U.S. Appl. No. 15/835,823, filed Dec. 8, 2017, Allin et al.

PCT/US2018/025144, Jun. 21, 2018, International Search Report and Written Opinion.

PCT/US2018/064217, Mar. 13, 2019, International Search Report and Written Opinion.

U.S. Appl. No. 17/079,994, filed Oct. 26, 2020, Dickie.

EP 18720443.3, Jun. 22, 2021, Communication pursuant to Article 94(3) EPC.

Communication pursuant to Article 94(3) EPC dated Dec. 8, 2021 in connection with European Application No. 18830094.1.

Communication pursuant to Article 94(3) EPC dated Jan. 25, 2022 in connection with European Application No. 19730617.8.

U.S. Appl. No. 17/536,617, filed Nov. 29, 2021, Allin et al.

EP 18830094.1, Dec. 8, 2021, Communication pursuant to Article 94(3) EPC.

Communication pursuant to Article 94(3) EPC dated Jun. 22, 2021 in connection with European Application No. 18720443.3.

Gawade et al., Stethoscope: a platform for interactive visual analysis of query execution plans. Proceedings of the VLDB Endowment. Aug. 1, 2012;5(12):1926-9.

Mishra et al., ConEx: a system for monitoring queries. Proceedings of the 2007 ACM SIGMOD international conference on Management of data. Jun. 11, 2007:1076-78.

International Search Report and Written Opinion for International Application No. PCT/US2022/045358 dated Feb. 2, 2023.

Communication pursuant to Article 94(3) EPC dated Feb. 24, 2023 in connection with European Application No. 18830094.1.

Extended European Search Report dated Nov. 17, 2023 in connection with European Application No. 23191257.7.

Extended European Search Report dated Nov. 28, 2023 in connection with European Application No. 23191246.0.

Kajdanowicz et al., Parallel processing of large graphs. Future Generation Computer Systems. Mar. 1, 2014;32:324-37.

Extended European Search Report dated Apr. 19, 2023 in connection with European Application No. 23155765.3.

Hameurlain et al., A cost evaluator for parallel database systems. InDatabase and Expert Systems Applications: 6th International Conference, DEXA'95 London, United Kingdom, Sep. 4-8, 1995 Proceedings 6 1995:146-56.

Hameurlain et al., An optimization method of data communication and control for parallel execution of SQL queries. InDatabase and Expert Systems Applications: 4th International Conference, DEXA'93 Prague, Czech Republic, Sep. 6-8, 1993 Proceedings 4 1993:301-12.

* cited by examiner

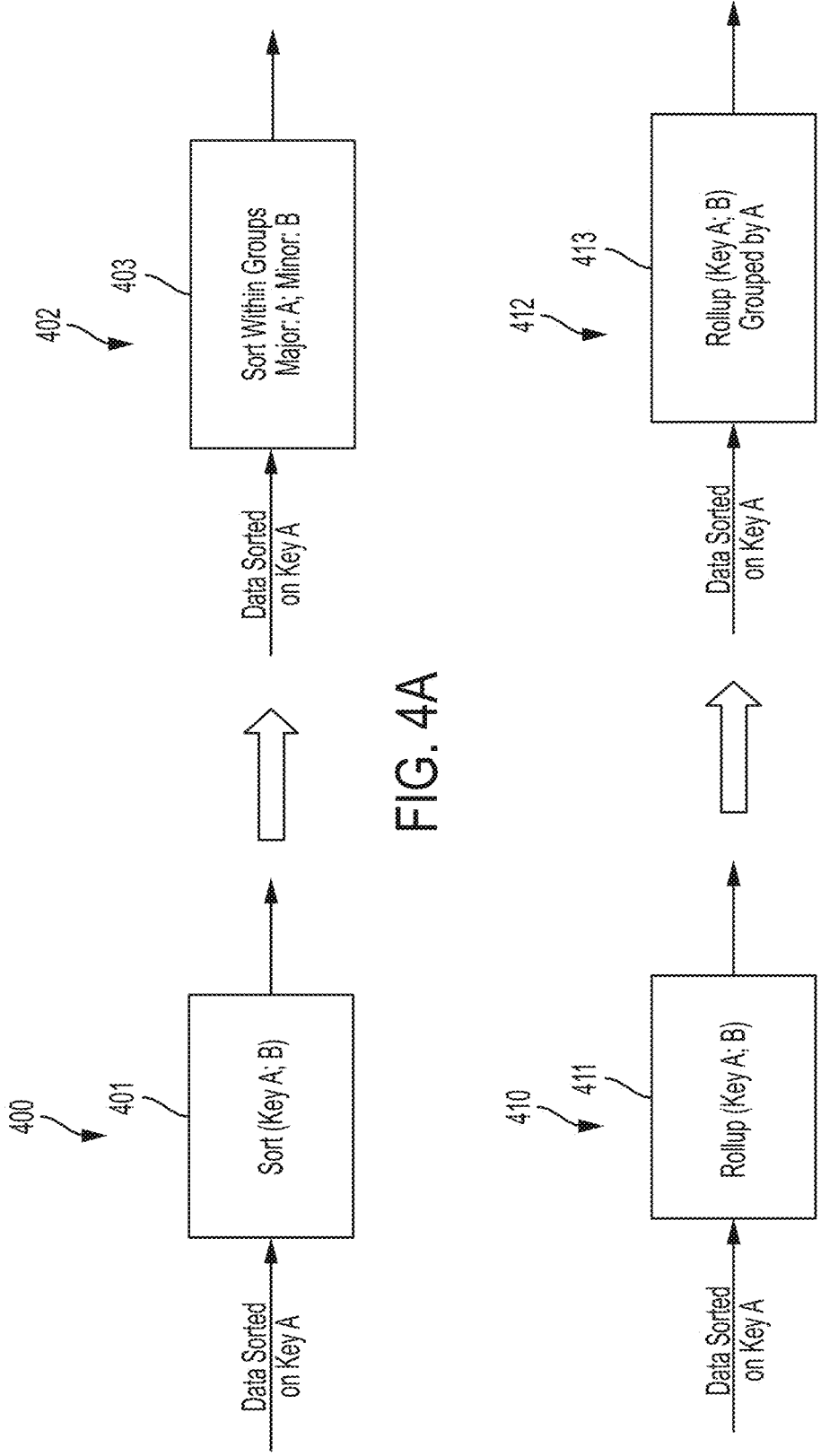

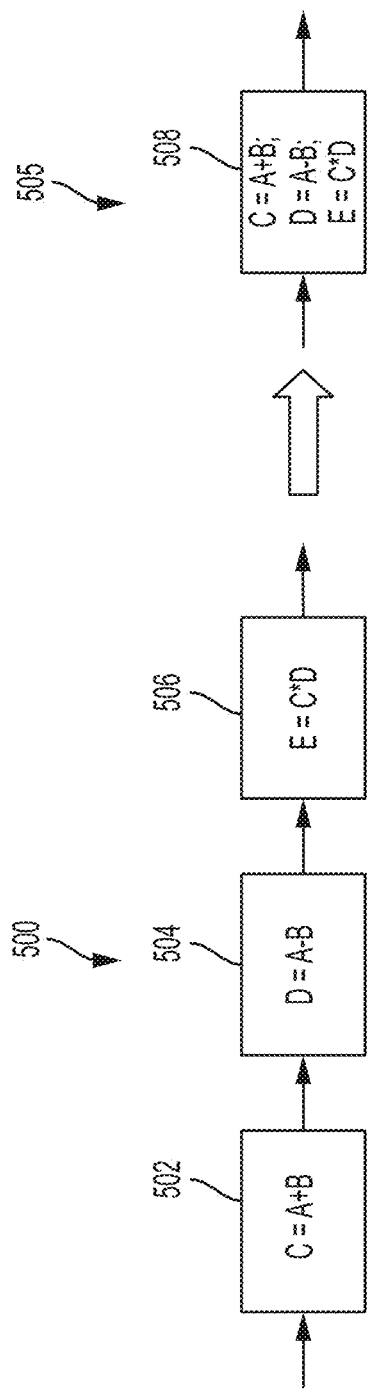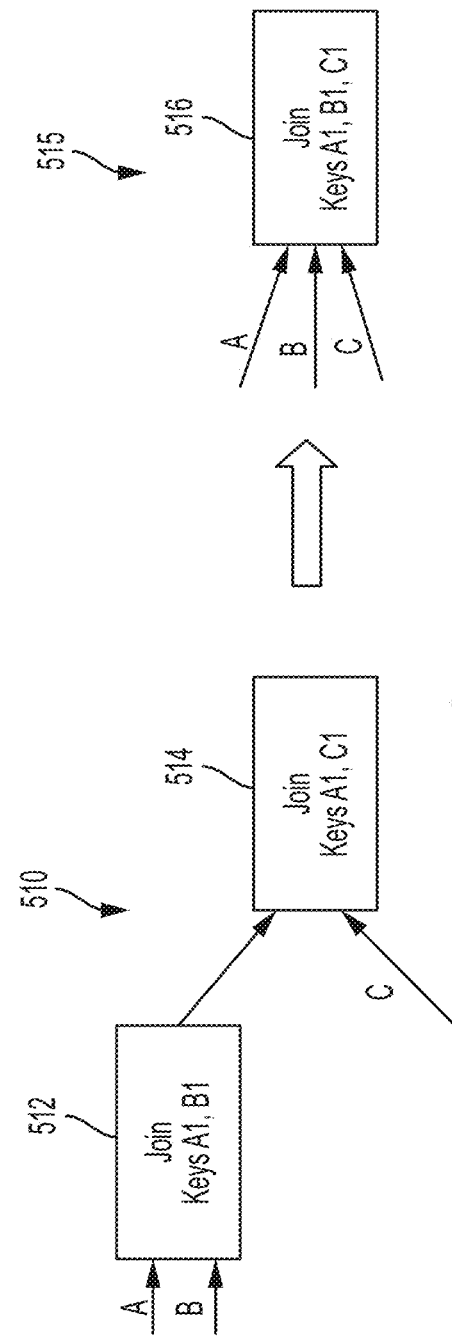

SYSTEMS AND METHODS FOR DATAFLOW GRAPH OPTIMIZATION

BACKGROUND

A data processing system may use one or more computer programs to process data. One or more of the computer programs utilized by the data processing system may be developed as dataflow graphs. A dataflow graph may include components, termed "nodes" or "vertices," representing data processing operations to be performed on input data and links between the components representing flows of data. Nodes of a dataflow graph may include one or more input nodes representing respective input datasets, one or more output nodes representing respective output datasets, and one or more nodes representing data processing operations to be performed on data. Techniques for executing computations encoded by dataflow graphs are described in U.S. Pat. No. 5,966,072, titled "Executing Computations Expressed as Graphs," and in U.S. Pat. No. 7,716,630, titled "Managing Parameters for Graph-Based Computations," each of which is incorporated by reference herein in its entirety.

SUMMARY

Some embodiments are directed to a data processing system, comprising: at least one computer hardware processor; and at least one non-transitory computer-readable storage medium storing processor-executable instructions that, when executed by the at least one computer hardware processor, cause the at least one computer hardware processor to perform: obtaining an automatically generated initial dataflow graph, the initial dataflow graph comprising a first plurality of nodes representing a first plurality of data processing operations and a first plurality of links representing flows of data among nodes in the first plurality of nodes; and generating an updated dataflow graph by iteratively applying dataflow graph optimization rules to update the initial dataflow graph, the updated dataflow graph comprising a second plurality of nodes representing a second plurality of data processing operations and a second plurality of links representing flows of data among nodes in the second plurality of nodes, wherein the second plurality of nodes includes a node representing a first data processing operation and another node representing the second data processing operation; and executing the updated dataflow graph at least in part by executing the first data processing operation using a first computer system process and executing the second data processing operation using a second computer system process different from the first computer system process.

Some embodiments are directed to a method, comprising using at least one computer hardware processor to perform: obtaining an automatically generated initial dataflow graph, the initial dataflow graph comprising a first plurality of nodes representing a first plurality of data processing operations and a first plurality of links representing flows of data among nodes in the first plurality of nodes; and generating an updated dataflow graph by iteratively applying dataflow graph optimization rules to update the initial dataflow graph, the updated dataflow graph comprising a second plurality of nodes representing a second plurality of data processing operations and a second plurality of links representing flows of data among nodes in the second plurality of nodes, wherein the second plurality of nodes includes a node representing a first data processing operation and another node representing the second data processing operation; and executing the updated dataflow graph at least in part by executing the first data processing operation using a first computer system process and executing the second data processing operation using a second computer system process different from the first computer system process.

Some embodiments are directed at least one non-transitory computer-readable storage medium storing processor-executable instructions that, when executed by at least one computer hardware processor, cause the at least one computer hardware processor to perform: obtaining an automatically generated initial dataflow graph, the initial dataflow graph comprising a first plurality of nodes representing a first plurality of data processing operations and a first plurality of links representing flows of data among nodes in the first plurality of nodes; and generating an updated dataflow graph by iteratively applying dataflow graph optimization rules to update the initial dataflow graph, the updated dataflow graph comprising a second plurality of nodes representing a second plurality of data processing operations and a second plurality of links representing flows of data among nodes in the second plurality of nodes, wherein the second plurality of nodes includes a node representing a first data processing operation and another node representing the second data processing operation; and executing the updated dataflow graph at least in part by executing the first data processing operation using a first computer system process and executing the second data processing operation using a second computer system process different from the first computer system process.

Some embodiments are directed to at least one non-transitory computer-readable storage medium storing processor-executable instructions, the processor-executable instructions comprising: means for obtaining an automatically generated initial dataflow graph, the initial dataflow graph comprising a first plurality of nodes representing a first plurality of data processing operations and a first plurality of links representing flows of data among nodes in the first plurality of nodes; and means for generating an updated dataflow graph by iteratively applying dataflow graph optimization rules to update the initial dataflow graph, the updated dataflow graph comprising a second plurality of nodes representing a second plurality of data processing operations and a second plurality of links representing flows of data among nodes in the second plurality of nodes, wherein the second plurality of nodes includes a node representing a first data processing operation and another node representing the second data processing operation; and means for executing the updated dataflow graph at least in part by executing the first data processing operation using a first computer system process and executing the second data processing operation using a second computer system process different from the first computer system process.

Some embodiments are directed to a data processing system, comprising: at least one computer hardware processor; and at least one non-transitory computer-readable storage medium storing processor-executable instructions that, when executed by the at least one computer hardware processor, cause the at least one computer hardware processor to perform: obtaining a structured query language (SQL) query; generating a query plan for the SQL query; generating an initial dataflow graph using the query plan, the initial dataflow graph comprising a first plurality of nodes representing a first plurality of data processing operations; and generating an updated dataflow graph by using at least one dataflow graph optimization rule to update the initial dataflow graph, the updated dataflow graph comprising a second plurality of nodes representing a second plurality of data processing operations.

Some embodiments are directed to a method comprising using at least one computer hardware processor to perform: obtaining a structured query language (SQL) query; generating a query plan for the SQL query; generating an initial dataflow graph using the query plan, the initial dataflow graph comprising a first plurality of nodes representing a first plurality of data processing operations; and generating an updated dataflow graph by using at least one dataflow graph optimization rule to update the initial dataflow graph, the updated dataflow graph comprising a second plurality of nodes representing a second plurality of data processing operations.

Some embodiments are directed to at least one non-transitory computer-readable storage medium storing processor-executable instructions that, when executed by at least one computer hardware processor, cause the at least one computer hardware processor to perform: obtaining a structured query language (SQL) query; generating a query plan for the SQL query; generating an initial dataflow graph using the query plan, the initial dataflow graph comprising a first plurality of nodes representing a first plurality of data processing operations; and generating an updated dataflow graph by using at least one dataflow graph optimization rule to update the initial dataflow graph, the updated dataflow graph comprising a second plurality of nodes representing a second plurality of data processing operations.

Some embodiments are directed to at least one non-transitory computer-readable storage medium storing processor-executable instructions, the processor-executable instructions comprising: means for obtaining a structured query language (SQL) query; means for generating a query plan for the SQL query; means generating an initial dataflow graph using the query plan, the initial dataflow graph comprising a first plurality of nodes representing a first plurality of data processing operations; and means for generating an updated dataflow graph by using at least one dataflow graph optimization rule to update the initial dataflow graph, the updated dataflow graph comprising a second plurality of nodes representing a second plurality of data processing operations.

The foregoing is a non-limiting summary of the invention, which is defined by the attached claims.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

FIG. 4A illustrates applying an optimization rule to an illustrative dataflow graph to perform a strength reduction optimization, in accordance with some embodiments of the technology described herein.

FIG. 4B illustrates applying an optimization rule to an illustrative dataflow graph to perform another strength reduction optimization, in accordance with some embodiments of the technology described herein.

FIG. 5A illustrates applying an optimization rule to an illustrative dataflow graph to perform a combining operations optimization, in accordance with some embodiments of the technology described herein.

FIG. 5B illustrates applying an optimization rule to another illustrative dataflow graph to perform a combining operations optimization, in accordance with some embodiments of the technology described herein.

DETAILED DESCRIPTION

Figure 1A:
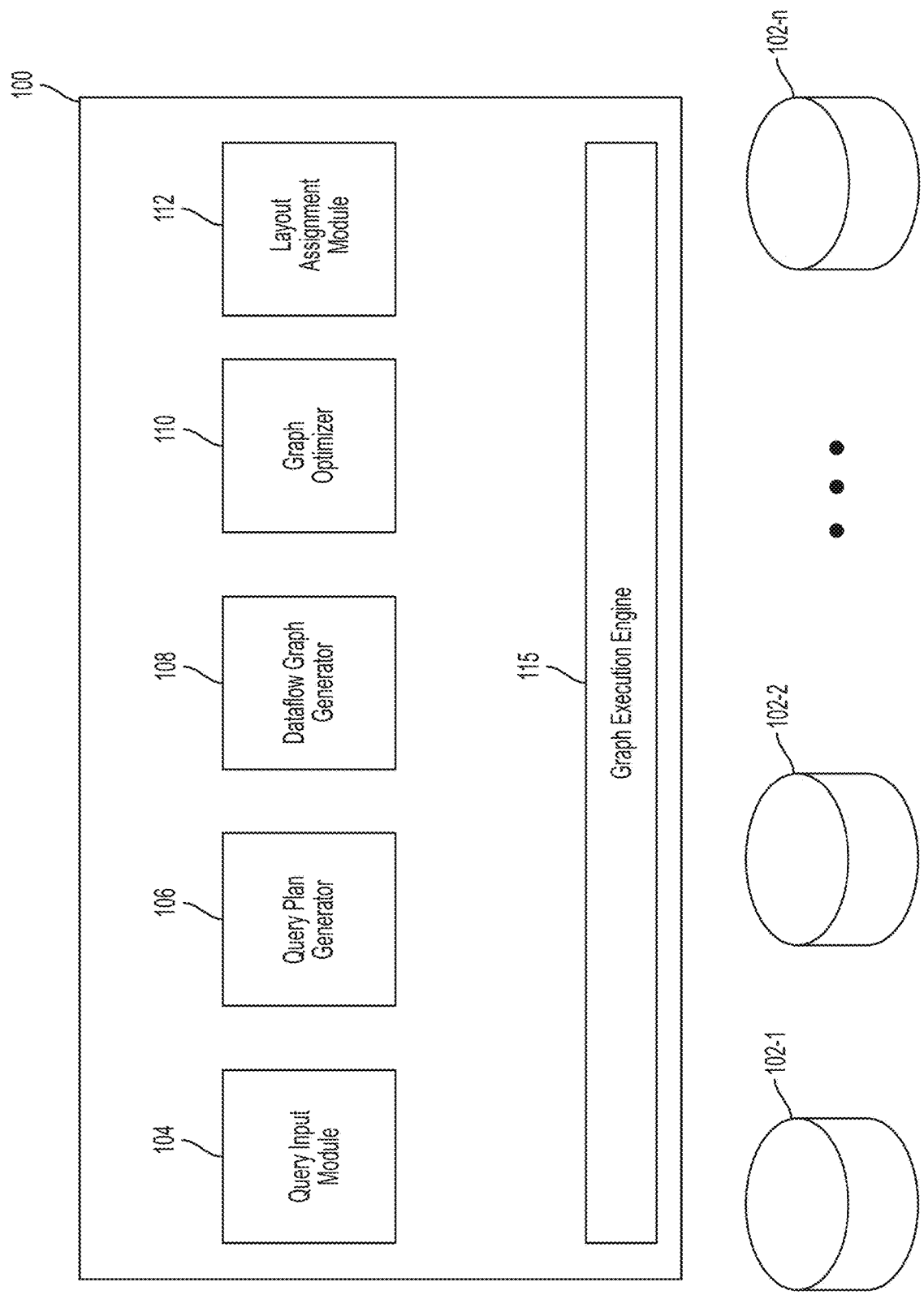
FIG. 1A is a block diagram of an illustrative computing environment, in which some embodiments of the technology described herein may operate.

Aspects of the technology described herein are related to increasing the speed, throughput, and accuracy of a data processing system by improving upon conventional techniques for performing data processing operations using dataflow graphs.

Some data processing systems process data using dataflow graphs. In many cases, the dataflow graphs are automatically generated rather than being manually specified. For example, some data processing systems may automatically generate dataflow graphs from structured query language (SQL) queries. In such cases, a user or a computer program may provide an input SQL query to a data processing system, and the data processing system may execute the SQL query by generating a dataflow graph from the SQL query and executing the generated dataflow graph. As another example, a data processing system may receive, from a user or a computer program, a representation of an input query, which representation is not a SQL query, and may automatically generate a dataflow graph from the representation of the query. As yet another example, a data processing system may receive an input dataflow graph from another data processing system. The input dataflow graph may not be suitable for execution in the data processing system (even in instances where the input dataflow graph may be suitable for execution in the other data processing system). Accordingly, the data processing system generates, from the input dataflow graph, a new dataflow graph that is suitable for execution on the data processing system.

The inventors have recognized that conventional techniques for automatically generating dataflow graphs (e.g., from SQL queries, other query representations, or input dataflow graphs as discussed above) may be improved upon. Although automatically generated dataflow graphs may be executed on a data processing system, conventional techniques for automatically generating dataflow graphs produce dataflow graphs whose execution requires significant computational resources (e.g., processor resources, memory resources, network resources, etc.) and a substantial amount of time. For example, an automatically generated dataflow graph: (1) may include nodes that represent redundant data processing operations; (2) may require performing data processing operations whose results are subsequently unused; (3) may require unnecessarily performing serial processing in cases where parallel processing is possible; (4) may apply a data processing operation to more data than needed in order to obtain a desired result; (5) may break out computations over multiple nodes, which significantly increases the computational cost of performing the computations in situations where the data processing for each dataflow graph node is performed by a dedicated thread in a computer program, a dedicated computer program (e.g., a process in an operating system), and/or a dedicated computing device; (6) may require performing a stronger type of data processing operation that requires more computation (e.g., a sort operation, a rollup operation, etc.) when a weaker type of data processing operation that requires less computation (e.g., a sort-within-groups operation, a rollup-within-groups operation, etc.) will suffice; and/or (7) may require the duplication of processing efforts.

The inventors have further recognized that conventional automated techniques for generating dataflow graphs may produce dataflow graphs whose execution requires significant computational resources and a substantial amount of time even if some conventional optimization techniques were used as part of the dataflow graph generation process. For example, a dataflow graph may be generated from a SQL query by generating a query plan from the SQL query and generating the dataflow graph from the generated query plan. But even if the generation of a query plan were to involve performing certain optimizations, the resulting dataflow graph (produced from the query plan) may still require the expenditure of significant computational resources. Indeed, conventional techniques of generating dataflow graphs from query plans often result in the introduction of inefficiencies and may not be sophisticated enough to produce dataflow graphs that can be executed in a computationally efficient manner.

The inventors have recognized that the performance of a data processing system would be improved if automatically generated dataflow graphs were further processed and optimized to reduce the amount computational resources used to execute the generated dataflow graphs. Some of the dataflow graph optimization techniques described in this application were developed by the inventors for this reason. The dataflow graph optimization techniques described herein improve the performance (e.g., throughput, speed, accuracy, etc.) of data processing systems by reducing the amount of computational resources (e.g., processor resources, memory resources, network resources, etc.) used for executing the dataflow graphs generated at least in part by using the dataflow graph optimization techniques.

Another benefit of the dataflow graph optimization techniques described herein is that the presence of a dataflow graph optimizer as part of a data processing system allows developers of other data processing system components and/or users of the data processing system to rely on the dataflow graph optimizer rather than trying to perform ad hoc optimization as part of their own work. This serves not only to reduce the work that has to be done by such developers and/or users, but also prevents them from unwittingly introducing errors into the data processing system, which of course also improves data processing systems by reducing the number of errors.

It should be appreciated that the dataflow graph optimization techniques described herein may, but do not necessarily, produce dataflow graphs that are "optimal" in some sense. Rather, the optimization techniques generally attempt to improve the performance of a data processing system, when executing a dataflow graph, by making changes to the dataflow graph before it is executed to improve the computational efficiency of its execution.

Some embodiments described herein address all of the above-described issues that the inventors have recognized with conventional techniques for automatically generating dataflow graphs. However, not every embodiment described herein addresses every one of these issues, and some embodiments may not address any of them. As such, it should be appreciated that embodiments of the technology described herein are not limited to addressing all or any of the above-discussed issues of conventional techniques for automatically generating dataflow graphs. For example, some embodiments of the technology described herein may be applied to optimizing manually-specified dataflow graphs, as such dataflow graphs also may include inefficiencies and demand more computing resources than necessary.

Accordingly, some embodiments provide for novel techniques for automatically generating dataflow graphs from SQL queries and/or other inputs. Examples of such other inputs are provided herein. In some embodiments, a data processing system may: (1) obtain a structured query language (SQL) query; (2) generate a query plan for the SQL query; (3) generate an initial dataflow graph using the query plan; and (4) generate an updated dataflow graph by using at least one dataflow graph optimization rule to update the initial dataflow graph.

In some embodiments, the updated dataflow graph may be saved (e.g., in non-volatile memory) for subsequent use. Additionally or alternatively, in some embodiments, the updated dataflow graph may be executed by the data processing system. Prior to execution, the data processing system may assign a processing layout to each of one or more nodes of the updated dataflow graph.

In some embodiments, the initial dataflow graph may include a first plurality of nodes representing a respective plurality of data processing operations that would be performed if the initial dataflow graph were executed by a data processing system. The updated dataflow graph may include a second plurality of nodes representing a respective plurality of data processing operations that would be performed if the updated dataflow graph were executed by the data processing system. In some embodiments, the second plurality of nodes has fewer nodes than the first plurality of nodes. In such embodiments, the number of nodes in the updated dataflow graph is fewer than the number of nodes in the initial dataflow graph. The reduction in the number of nodes in the graph may reduce the amount of computational resources required to execute the updated dataflow graph relative to the computational resources that would have been used by the data processing system if the initial dataflow graph were executed instead.

In some embodiments, the data processing system may generate the updated dataflow graph from the initial dataflow graph by applying one or more dataflow graph optimization rules (examples of which are provided herein) to one or more portions of the initial dataflow graph. The optimization rules may be applied iteratively. For example, in some embodiments, the data processing system may update the initial dataflow graph by: (1) selecting a first optimization rule; (2) identifying a first portion of the initial dataflow graph to which to apply the first optimization rule; and (3) applying the first optimization rule to the first portion of the initial dataflow graph. Subsequently, the data processing system may continue updating the initial dataflow graph by: (1) selecting a second optimization rule different from the first optimization rule; (2) identifying a second portion of the initial dataflow graph to which to apply the second optimization rule; and (3) applying the second optimization rule to the second portion of the initial dataflow graph.

There are a number of ways in which the application of optimization rules may be considered with respect to the initial dataflow graph being updated. For example, in some embodiments, for each particular optimization rule, the data processing system may identify the portions of the dataflow graph to which the particular optimization rule is applicable and apply the optimization rule to the identified portions. As another example, in some embodiments, for each particular portion of a dataflow graph, the data processing system may identify the optimization rules that may be applied to the particular portion, and apply the identified optimization rules to the particular portion. In such embodiments, the initial dataflow graph may be topologically sorted and the topologically sorted graph may be traversed (e.g., left-to-right) to identify the particular portions to which an optimization rule may be applied.

In some embodiments, the data processing system may employ a dataflow subgraph pattern matching language to identify one or more portions of the initial dataflow graph to which to apply one or more optimization rules. The dataflow subgraph pattern matching language may include one or more expressions representing respective patterns to be identified in a dataflow graph. Examples of such expressions are provided herein.

In some embodiments, in order to identify a portion of an initial dataflow graph to which to apply a particular optimization rule, the data processing system may determine whether one or more nodes commutes with one or more other nodes. In other words, the data processing system may determine whether the order of appearance of one or more nodes in the dataflow graph may be altered without changing the processing results. This is a valuable feature because, if there are commuting nodes, by changing the order of at least some of the commuting nodes, an optimization rule may become applicable to a portion of the graph, whereas that rule would not have otherwise been applicable.

Figure 3A:
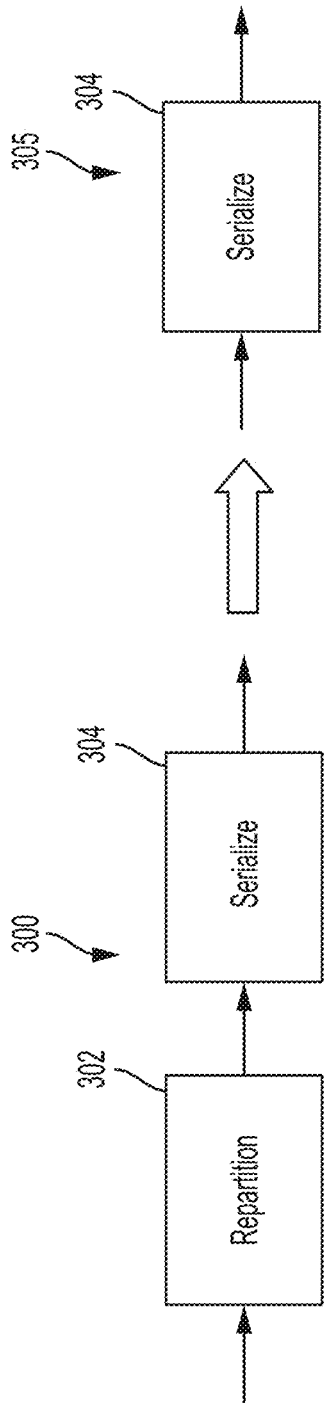
FIG. 3A illustrates applying an optimization rule to an illustrative dataflow graph to remove one or more redundant data processing operations, in accordance with some embodiments of the technology described herein.
Figure 3B:
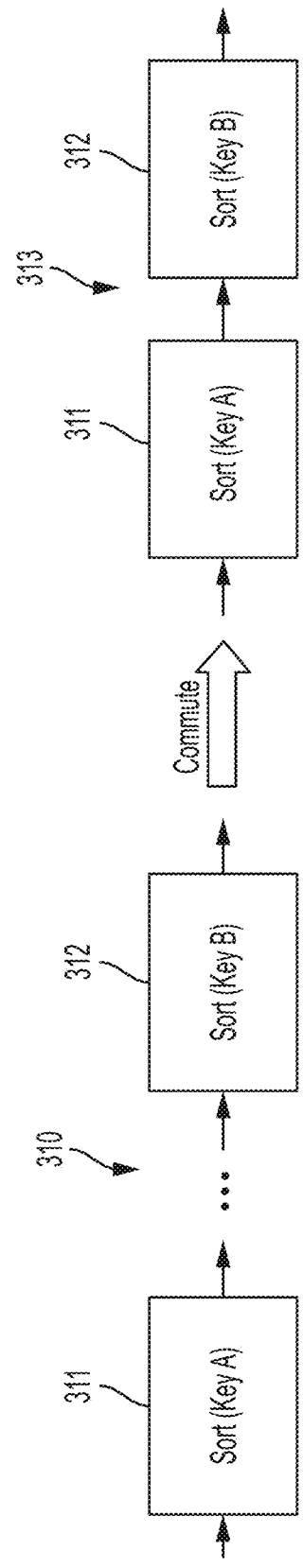
FIG. 3B illustrates changing the order of commuting data processing operations to facilitate application of an optimization rule to another illustrative dataflow graph, in accordance with some embodiments of the technology described herein.
Figure 3C:
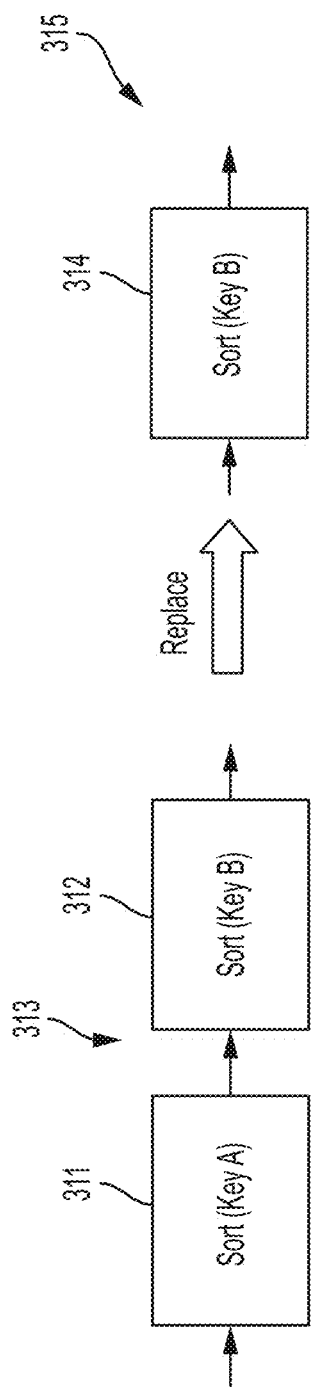
FIG. 3C illustrates applying an optimization rule to another illustrative dataflow graph to remove one or more redundant data processing operations, in accordance with some embodiments of the technology described herein.

For example, an optimization rule may involve identifying two adjacent nodes in the initial dataflow graph representing respective sort operations, with the second sort operation nullifying the effect of the first operation such that the first operation should be dropped (see e.g., the example shown in FIGS. 3B and 3C). By definition, such an optimization rule would not be applied to a dataflow graph that does not have adjacent nodes representing sort operations. However, if a first node representing a first sort operation were to commute with one or more other nodes, then it may be possible to change the order of the first node with at least one of the one or more other nodes such that the first node representing the first sort operation is placed adjacent to a second node representing a second sort operation. As a result of commuting nodes in this way, the optimization rule that removes the redundant first sort operation may be applied to the dataflow graph. Accordingly, in some embodiments, identifying the first portion of the initial dataflow graph may comprise identifying a first node representing a sort data processing operation that commutes with a data processing operation represented by a second node connected to the first node.

In some embodiments, any one or more of numerous types of optimization rules may be applied when generating the updated dataflow graph from the initial dataflow graph. By way of example and not limitation, applying an optimization rule to the initial dataflow graph may involve removing one or more redundant data processing operations, removing one or more unreferenced data processing operations, performing one or more strength reduction optimizations, performing one or more combining operations optimizations, performing one or more width reduction optimizations, and/or performing one or more deduplication optimizations.

In some embodiments, an optimization rule may be embodied in program code that, when executed, causes a corresponding optimization to be performed on a dataflow graph. For example, an optimization rule for removing redundancy may be embodied in program code that, when executed, causes the removal (from the dataflow graph to which the rule is applied) of at least one node representing a data processing operation determined to be redundant. The program code may be written in any programming language, as aspects of the technology described herein are not limited in this respect.

As yet another example, an optimization rule for removing one or more unreferenced data processing operations may be embodied in program code that, when executed, causes the removal (from the dataflow graph to which the rule is applied) of at least one node representing a data processing operation whose results are unreferenced and/or unused (e.g., a sort data processing operation that is unreferenced because the order resulting from the sorting is not needed or relied upon in subsequent processing).

As yet another example, an optimization rule for performing a strength reduction may be embodied in program code that, when executed, causes the replacement (in the dataflow graph to which the rule is applied) of a first node representing a first data processing operation (e.g., a node representing a sort data processing operation) with a second node representing a second data processing operation of a weaker type that the first data processing operation (e.g., a node representing a sort-within-groups data processing operation).

As yet another example, an optimization rule for performing a combining operations optimization may be embodied in program code that, when executed, causes the replacement (in the dataflow graph to which the rule is applied) of multiple nodes representing multiple operations with a single node representing the combination of these multiple operations.

As yet another example, an optimization rule for performing a width-reduction optimization may be embodied in program code that, when executed, causes some data (e.g., one or more columns of data) to be deleted at a certain portion in the graph prior to the performance of subsequent operations because that data (i.e., the deleted data) is not used in subsequent operations and need not be propagated as part of the processing. As yet another example, a node in a dataflow graph may be configured to perform several computations, and the results of some of these computations may be unused. Accordingly, in some embodiments, an optimization rule for performing a width reduction optimization may be embodied in program code that, when executed, causes the particular node to be replaced with another node that is configured to perform only those computations whose results are used; unnecessary computations are no longer performed.

As yet another example, an optimization rule for performing a deduplication optimization may be embodied in program code that, when executed, causes different branches of the dataflow graph to which the rule is applied to be merged.

It should be appreciated that the techniques introduced above and discussed in greater detail below may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

FIG. 1A is a diagram of an illustrative data processing system 100, in accordance with some embodiments of the technology described herein. As illustrated in FIG. 1A, data processing system 100 includes query input module 104, query plan generator 106, dataflow graph generator 108, graph optimizer 110, layout assignment module 112, and graph execution engine 115.

Data processing system 100 is configured to access (e.g., read data from and/or write data to) data stores 102-1, 102-2, . . . , and 102-n. Each of data stores 102-1, 102-2, . . . , and 102-n, may store one or more datasets. A data store may store any suitable type of data in any suitable way. A data store may store data as a flat text file, a spreadsheet, using a database system (e.g., a relational database system), or in any other suitable way. In some instances, a data store may store transactional data. For example, a data store may store credit card transactions, phone records data, or bank transactions data. It should be appreciated that data processing system 100 may be configured to access any suitable number of data stores of any suitable type, as aspects of the technology described herein are not limited in this respect. A data store from which data processing system 100 may be configured to read data may be referred to as a data source. A data store from to which data processing system 100 may be configured to write data may be referred to as a data sink.

In some embodiments, the data stores 102-1, 102-2, . . . , 102-n may be of a same type (e.g., all may be relational databases) or different types (e.g., one may be relational database while another may be a data store that stores data in flat files. A data store may be a SQL server data store, an ORACLE data store, a TERADATA data store, a flat file data store, a multi-file data store, a HADOOP data store, a DB2 data store, a Microsoft SQL SEVER data store, an INFORMIX data store, a SAP data store, a MongoDB data store, a metadata datastore, and/or or any other suitable type of data store, as aspects of the technology described herein are not limited in this respect.

In some embodiments, query input module 104 may be configured to receive an input SQL query. In some embodiments, the query input module 104 may be configured to receive an input SQL query from a user. For example, the query input module 104 may be configured to generate a graphical user interface through which a user may input a SQL query. As another example, the query input module 104 may be configured to receive information provided by a user through a graphical user interface (one that was not necessarily generated by the query input module 104 itself). In some embodiments, the query input module 104 may be configured to receive an input SQL query from another computer program. For example, the query input module 104 may expose an application programming interface (API) through which an input SQL query may be provided (e.g., the open database connectivity (ODBC) API and the Java database connectivity (JDBC) API), may access an SQL query in response to a notification that a SQL query is to be accessed, or receive the input SQL query from the other computer program in any other suitable way.

The SQL query received by query input module 104 may involve reading data from and/or writing data to a single data store. Alternatively, the SQL query received by the query input module 104 may involve reading data from and/or writing data to multiple data stores. When the data stores are of different types, the SQL query may be referred to as a federated SQL query. In some embodiments, the SQL query may be involve reading data from and/or writing data to a federated database.

In some embodiments, the query plan generator 106 is configured to generate a query plan from the SQL query received by the query input module 104. The generated query plan may identify one or more data processing operations to be performed if the SQL query were executed. The generated query plan may further specify an order in which the identified data processing operations are to be executed.

As such, the generated query plan may represent a sequence of data processing operations to perform in order to execute the SQL query received by query input module 104. The query plan generator 106 may be configured to generate a query plan in any suitable way. For example, in some embodiments, the query plan generator 106 may implement any of the techniques for generating query plans described in U.S. Pat. No. 9,116,955, titled "Managing Data Queries," which is incorporated by reference herein in its entirety.

In some embodiments, the dataflow graph generator 108 is configured to generate an initial dataflow graph from the query plan generated by the query plan generator 106. The dataflow graph generator 108 may be configured to generate the initial dataflow graph from a query plan in any suitable way. For example, in some embodiments, the dataflow graph generator 108 may implement any of the techniques for generating query plans described in U.S. Pat. No. 9,116,955, titled "Managing Data Queries," which is incorporated by reference herein in its entirety.

In some embodiments, a dataflow graph may include components, termed "nodes" or "vertices," representing data processing operations to be performed on input data and links between the components representing flows of data. Nodes of a dataflow graph may include one or more input nodes representing respective input datasets, one or more output nodes representing respective output datasets, and one or more nodes representing data processing operations to be performed on data. In some embodiments, an input node may represent a federated database or any other type of database. Similarly, in some embodiments, an output node may represent a federated database or any other type of database.

In some embodiments, different data processing operations represented by different nodes in a dataflow graph may be executed using different respective computer system processes. For example, a dataflow graph may include a first node representing a first data processing operation (e.g., a "sort" operation) and a second node representing a second data processing operation different from the first data processing operation (e.g., a "join" operation) and, in some embodiments, a first computer system process may be used to execute the first data processing operation and a second computer system process, which is different from the first computer system process, may be used to execute the second data processing operation. In some embodiments, the first and second computer system processes may execute on the same computing device and, for example, may be managed by the same operating system. In other embodiments, the first and second computer system processes may execute on different computing devices.

In some embodiments, a computer system process used to execute a data processing operation represented by a node in a dataflow graph may be an instance of a computer program configured to execute processor-executable instructions for encoding the data processing operation. A computer system process may be a single-threaded or a multi-threaded process. A computer system process may be associated with one or more computer system resources including, by way of example and not limitation, processor-executable instructions representing encoding the data processing operation, memory (e.g., a region of physical and/or virtual memory which holds executable code, process-specific input and/or output data, a call stack, a computation heap, and/or other data), a process identifier (e.g., used by an operating system to identify the computer system process), security attributes (e.g., permissions indicating one or more owners of the process and/or operations that the computer system process is allowed to perform), and/or information specifying the state of the computer system process.

In some embodiments, the initial dataflow graph may be generated from a query plan at least in part by generating the initial dataflow graph to include a node for each of at least a subset (e.g., some or all) of the data processing operations identified in the query plan. Subsequently, the order of data processing operations specified in the query plan may be used to generate links connecting nodes in the initial dataflow graph. For example, when the generated query plan indicates that a first data processing operation is performed before a second data processing operation, the generated initial dataflow graph may have a first node (representing the first data processing operation) and a second node (representing the second data processing operation) and one or more links specifying a path from the first node to the second node.

In some embodiments, generating the initial dataflow graph from the query plan comprises adding one or more nodes to the graph representing input and/or output data sources. For example, generating the initial dataflow graph may comprise adding an input node for each of the data sources from which data records are to be read during execution of the SQL query. Each of the input nodes may be configured with parameter values associated with the respective data source. These values may indicate how to access the data records in the data source. As another example, generating the initial dataflow graph may comprise adding an output node for each of the data sinks to which data records are to be written during execution of the SQL query. Each of the output nodes may be configured with parameter values associated with the respective data sinks. These values may indicate how to write the data records to the data source. In some embodiments, the initial dataflow graph may be runnable by a graph execution engine. In other embodiments, the initial dataflow graph may not be runnable by a graph execution engine.

In some embodiments, graph optimizer 110 is configured to generate an updated dataflow graph by using one or more dataflow graph optimization rules to update the initial dataflow graph generated by dataflow graph generator 108. Graph optimizer 110 may be configured to apply one or more of any of numerous types of optimization rules described herein to the initial dataflow graph. For example, graph optimizer 110 may be configured to update the initial dataflow graph by removing one or more redundant data processing operations, removing one or more unreferenced data processing operations, performing one or more strength reduction optimizations, performing one or more combining operations optimizations, performing one or more width reduction optimizations, and/or performing one or more deduplication optimizations. Graph optimizer 110 may be configured to operate in any suitable way and, for example, may be configured to operate according to illustrative process 200 described with reference to FIG. 2 or one or more variants thereof.

In some embodiments, layout assignment module 112 may determine processing layouts for each of one or data processing operations represented by respective nodes in the updated dataflow graph generated by graph optimizer 110. A processing layout for a data processing operation may specify how many computing devices are to be used for performing the data processing operation and may identify the particular computing devices to be used to perform the data processing operation. Accordingly, in some embodiments, layout assignment module 112 may determine, for each of one or more nodes in the updated dataflow graph, whether the data processing operation is to be performed using a single device (e.g., a single processor, a single virtual machine, etc.) or multiple devices (e.g., multiple processors, multiple virtual machines, etc.) and which devices should be used. In some embodiments, the layout assignment module may assign different degrees of parallelism to different nodes in the updated dataflow graph. As such, it should be appreciated that different processing layouts may be assigned to different data processing operations that are to be performed during execution of the updated dataflow graph generated by graph optimizer 110.

In some embodiments, the updated dataflow graph may include multiple (e.g., two or more) nodes representing different data processing operations and different processes may be used to execute the data processing operations. For example, one or more computer system processes may be used to execute a data processing operation represented by a first node (e.g., multiple computer system processes may be used when the data processing operation is parallelized) and one or more other computer system processes may be used to execute a data processing operation represented by a second node in the updated dataflow graph different from the first node.

In some embodiments, graph execution engine 115 is configured to execute one or more dataflow graphs. For example, in some embodiments where initial dataflow graphs are runnable, graph execution engine 115 may be configured to execute any initial dataflow graph generated by dataflow graph generator 108. As another example, graph execution engine 115 may be configured to execute any updated dataflow graph generated by graph optimizer 110. The graph execution engine may comprise a co-operating system or any other suitable execution environment for executing dataflow graphs. Aspects of environments for developing and executing dataflow graphs are described in U.S. Pat. No. 5,966,072, titled "Executing Computations Expressed as Graphs," and in U.S. Pat. No. 7,716,630, titled "Managing Parameters for Graph-Based Computations," each of which is incorporated by reference herein in its entirety.

Figure 1B:
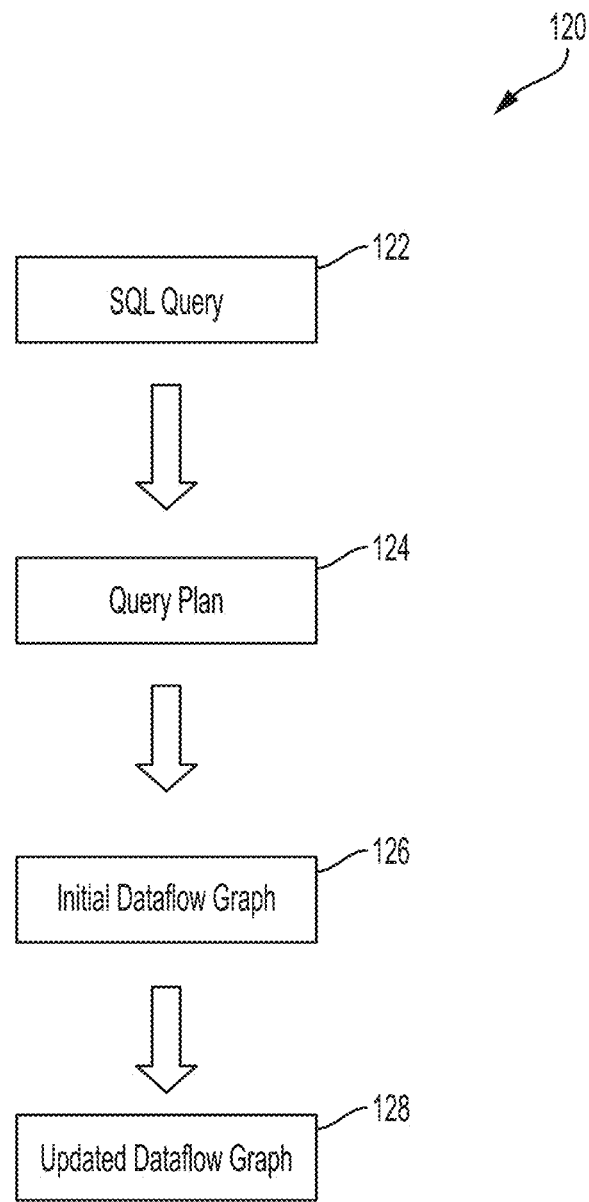
FIG. 1B is a flowchart of an illustrative process for automatically generating a dataflow graph from an input structured query language (SQL) query, in accordance with some embodiments of the technology described herein.

FIG. 1B is a flowchart of an illustrative process 120 for automatically generating a dataflow graph from an input structured query language (SQL) query, in accordance with some embodiments of the technology described herein. Process 120 may be performed by any suitable data processing system and, for example, may be performed by data processing system 100 described with reference to FIG. 1A.

Process 120 begins at act 122, where a SQL query is received. The SQL query may be received using query input module 104. This may be done in any suitable way including in any of the ways described with reference to act 202 of process 200.

Next, process 120 proceeds to act 124, where a query plan is generated from the SQL query received at act 122. The query plan may be generated using query plan generator 106. This may be done in any suitable way including in any of the ways described with reference to act 204 of process 200.

Next, process 120 proceeds to act 126, where an initial dataflow graph is generated from the query plan obtained at act 124. The initial query plan may be generated by dataflow graph generator 108. This may be done in any suitable way including in any of the ways described with reference to act 206 of process 200.

Next, process 120 proceeds to act 128, where an updated dataflow graph is generated from the initial dataflow graph by applying one or more optimization rules to the initial dataflow graph. The updated dataflow graph may be generated by graph optimizer 110. This may be done in any suitable way including in any of the ways described with reference to act 207 of process 200.

The updated dataflow graph may be stored for subsequent use or executed by a data processing system. Prior to execution, processing layouts may be assigned to one or more data processing operations represented by nodes in the updated dataflow graph. The processing layouts may be assigned to the data processing operations by layout assignment module 112.

Figure 2:
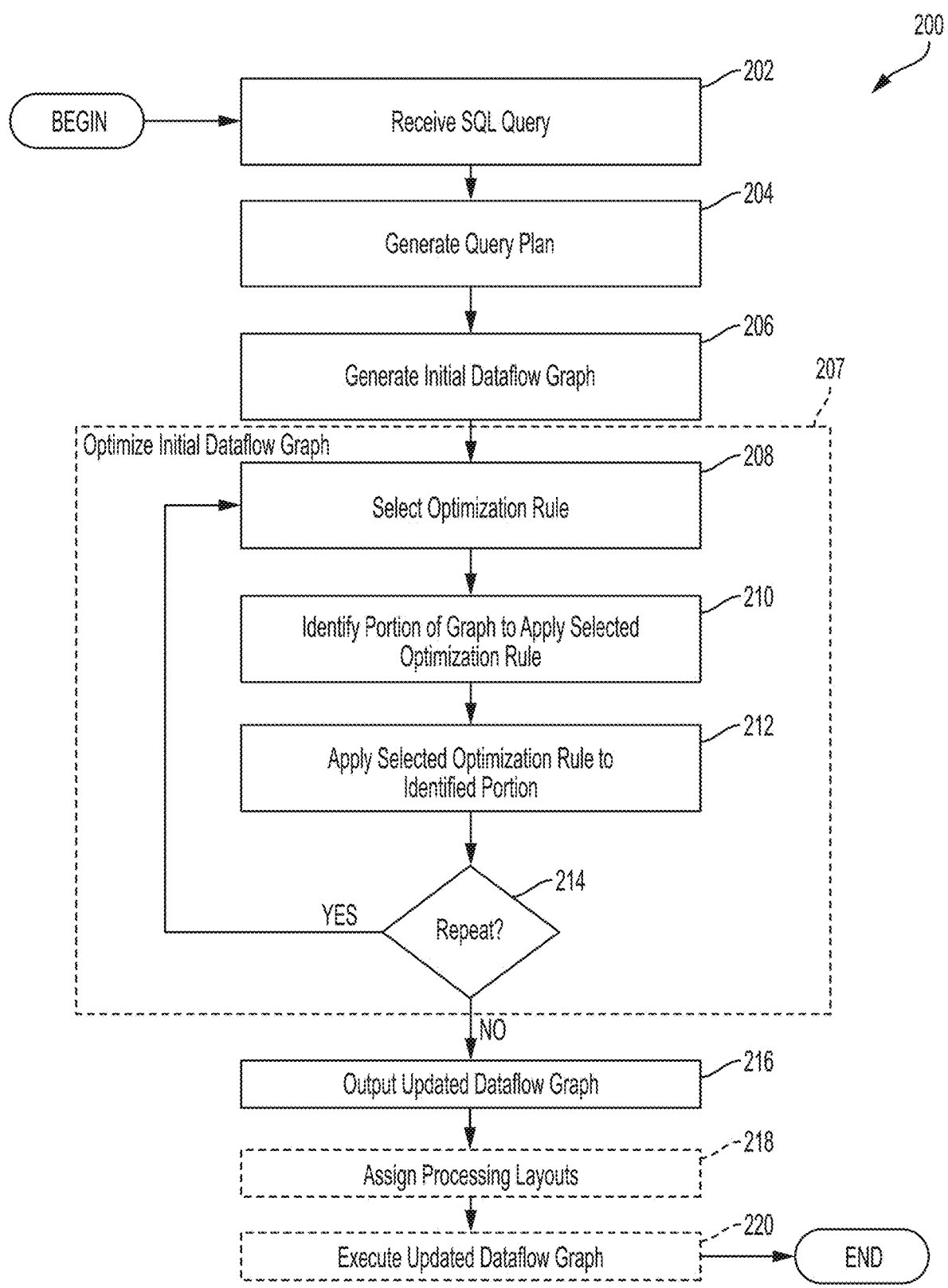
FIG. 2 is a flowchart of an illustrative process 200 for automatically generating a dataflow graph from an input SQL query, in accordance with some embodiments of the technology described herein.

FIG. 2 is a flowchart of an illustrative process 200 for automatically generating a dataflow graph from an input SQL query, in accordance with some embodiments of the technology described herein. Process 200 may be executed using any suitable data processing system including, for example, data processing system 100 described with reference to FIG. 1A.

Process 200 begins at act 202, where a SQL query is received. In some embodiments, the SQL query may be received by the data processing system executing process 200 as a result of a user providing the SQL query as input to the data processing system. The user may input the SQL query through a graphical user interface or any other suitable type of interface. In other embodiments, the SQL query may be provided to the data processing system by another computer program. For example, the SQL query may be provided by a computer program configured to cause the data processing system to execute one or more SQL queries, each of which may have been specified by a user or automatically generated. The SQL query may be of any suitable type and may be provided in any suitable format, as aspects of the technology described herein are not limited in this respect.

Next, process 200 proceeds to act 204, where a query plan is generated from the SQL query received at act 202. The generated query plan may identify one or more data processing operations to be performed if the SQL query were executed. The generated query plan may further specify an order in which the identified data processing operations are to be executed. As such, the generated query plan may represent a sequence of data processing operations to perform in order to execute the SQL query received at act 202. The generated query plan may be generated using any suitable type of query plan generator (e.g., query plan generator 106). Some illustrative techniques for generating query plans are described in U.S. Pat. No. 9,116,955, titled "Managing Data Queries," which is incorporated by reference herein in its entirety.

Next, process 200 proceeds to act 206, where an initial dataflow graph is generated from the query plan generated at act 204 using the SQL query received at act 202. In some embodiments, the initial dataflow graph may be generated from a query plan at least in part by generating the initial dataflow graph to include a node for each of at least a subset (e.g., some or all) of the data processing operations identified in the query plan. In some embodiments, a single node in a query plan may result in the inclusion of multiple nodes in the initial dataflow graph. Subsequently, the order of data processing operations specified in the query plan may be used to generate links connecting nodes in the initial dataflow graph. For example, when the generated query plan indicates that a first data processing operation is performed before a second data processing operation, the generated initial dataflow graph may have a first node (representing the first data processing operation) and a second node (representing the second data processing operation) and one or more links specifying a path from the first node to the second node.

In some embodiments, generating the initial dataflow graph from the query plan comprises adding one or more nodes to the graph representing input and/or output data sources. For example, generating the initial dataflow graph may comprise adding an input node for each of the data sources from which data records are to be read during execution of the SQL query. Each of the input nodes may be configured with parameter values associated with the respective data source. These values may indicate how to access the data records in the data source. As another example, generating the initial dataflow graph may comprise adding an output node for each of the data sinks to which data records are to be written during execution of the SQL query. Each of the output nodes may be configured with parameter values associated with the respective data sinks. These values may indicate how to write the data records to the data source.

It should be appreciated that the initial dataflow graph generated at act 206 is different from the query plan generated at act 204. A dataflow graph can be executed by a graph execution engine (e.g., graph execution engine 115), whereas a query plan cannot be executed by the graph execution engine—it is an intermediate representation that is used to generate the dataflow graph, which dataflow graph is executed by the graph execution engine in order to execute the SQL query. A query plan is not executable and, even in the context of a relational database management system, it needs to be further processed to generate an execution strategy. By contrast, a dataflow graph is executable by the graph execution engine in order to perform the SQL query. In addition, even after further processing by a relational database system, the resulting execution strategy does not allow for reading data from and/or writing data to other types of data sources and/or data sinks, whereas dataflow graphs are not limited in this respect.

In some embodiments, the initial dataflow graph generated at act 206 may contain a node representing a data processing operation, which is not in the query plan generated at act 204. Conversely, in some embodiments, the initial dataflow graph generated at act 206 may not contain a node representing a data processing operation, which is in the query plan generated at act 204. Such situations may arise due to various optimizations which may be performed during the process of generating a dataflow graph from a query plan. In some embodiments, the initial dataflow graph generated at act 206 may contain a node representing a data processing operation other than a database operation being performed on a database computer system (e.g., a relational database management system).

In some embodiments, the query plan and the dataflow graph may be embodied in different types of data structures. For example, in some embodiments, the query plan may be embodied in a directed graph in which each node has a single parent node (e.g., a tree, such as, for example, a binary tree), whereas the dataflow graph may be embodied in a directed acyclic graph, which may have at least one node that has multiple parent nodes.

Next, process 200 proceeds to act 207, where the initial dataflow graph is updated to obtain an updated dataflow graph. This may be done in any of numerous ways. For example, in the illustrated embodiment, a dataflow graph optimization rule is selected at act 208. Next, the data processing system executing process 200 identifies a portion of the initial dataflow graph to which to apply the optimization rule identified at act 208. At act 212, the selected optimization rule is applied to the identified portion of the graph. Next, process 200 proceeds to decision block 214, where it is determined whether there is an optimization rule to apply to at least one more portion of the dataflow graph. If it is determined that there is an optimization rule to apply to at least one more portion of the graph (e.g., the optimization rule selected at act 208 could be applied to another portion of the graph different from the portion identified at act 210, a different optimization rule could be selected altogether, etc.), process 200 returns to act 208. Otherwise, process 200 proceeds to act 216.

In some embodiments, for each particular optimization rule selected at act 208, the data processing system may identify the portions of the dataflow graph to which the selected optimization rule is applicable and apply the optimization rule to the identified portions. Once all such portions have been identified, a different optimization rule may be selected. However, a previously-applied optimization rule may also be selected such that application of the same optimization rule to the dataflow graph may be considered multiple times (which may result in a more optimized dataflow graph than an approach in which the optimization rules are selected greedily and not used after having been applied once). The optimization rules may be selected in any suitable order, as aspects of the technology described herein are not limited in this respect. As one example, after performing deduplication optimization, any nodes representing redundant operations may be removed, and any empty nodes may be removed. After removing empty nodes, width reduction optimizations may be performed, etc.

In some embodiments, the order of acts 208 and 210 may be changed. In such embodiments, data processing system may first identify a portion of the dataflow graph, and then select an optimization rule that may be applied to the identified dataflow graph portion. In such embodiments, the initial dataflow graph may be topologically sorted and the topologically sorted graph may be traversed (e.g., left-to-right) to identify the particular portions to which an optimization rule may be applied.

In some embodiments, the data processing system may employ a dataflow subgraph pattern matching language to identify one or more portions of the initial dataflow graph to which to apply one or more optimization rules. The dataflow subgraph pattern matching language may include one or more expressions for identifying specific types of subgraphs in the dataflow graph. In some embodiments, the data processing system executing process 200 may be configured to use the expressions in the subgraph pattern matching language to identify portions of a dataflow graph to which to apply one or more optimization rules. A particular expression may facilitate identifying one or more portions for the application of a specific optimization rule or multiple optimization rules. In some embodiments, when the dataflow graph optimizer (e.g., graph optimizer 110) is configured with one or more new optimization rules, the graph optimizer may be configured with one or more new expressions written in the subgraph pattern matching language to facilitate identifying portions of a dataflow graphs to which the new optimization rule(s) may be applied.

For example, the pattern matching language may include expressions for identifying a series of nodes of at least a threshold length (e.g., at least two, three, four, five, etc.) representing a respective series of calculations that could be combined and represented by a single node in the graph using a combining operations optimization rule. Identifying such patterns may facilitate the application of the combining operations optimization rule, which is further described below including with reference to FIGS. 5A-5D. A non-limiting example of one such expression is "A→B→C→D", which may help to identify a series of four consecutive data processing operations which may be combined.

As another example, the pattern matching language may include expressions for identifying portions of the dataflow graph in which certain types of nodes can commute with other nodes. This may facilitate the application of multiple different types of optimization rules to the dataflow graph. When a data processing system determines that the order of one or more nodes in the dataflow graph may be altered without changing the processing results, this allows the data processing system to consider changes to the structure of the dataflow graph (as allowed by the degree of freedom available through commuting operations) in order to identify portions to which optimization rules could be applied. As a result of considering commuting-based alterations, one or more optimization rules may become applicable to a portion of a graph to which the rule(s) were otherwise not applicable.

For example, an optimization rule may involve identifying two adjacent nodes in the initial dataflow graph representing respective sort operations, with the second sort operation nullifying the effect of the first operation such that the first operation should be dropped (see e.g., the example shown in FIGS. 3B and 3C). By definition, such an optimization rule would not be applied to a dataflow graph that does not have adjacent nodes representing sort operations. However, if a first node representing a first sort operation were to commute with one or more other nodes, then it may be possible to change the order of the first node with at least one of the one or more other nodes such that the first node representing the first sort operation is placed adjacent to a second node representing a second sort operation. As a result of commuting nodes in this way, the optimization rule that removes the redundant first sort operation may be applied to the dataflow graph.

Accordingly, in some embodiments, the subgraph matching language may include one or more expressions for identifying subgraphs of a dataflow graph in situations where the order nodes in the dataflow graph may be changed. As one example, the expression "A*→( . . . )→B" (where each of A and B may be any suitable data processing operation such as a sort, a merge, etc.) may be used to find a portion of the dataflow graph having a node "A" (i.e., a node representing the operation "A") and node B (representing operation B), and one or more nodes between the nodes A and B with which the node A commutes (e.g., if the order of the nodes is changed, the result of processing performed by these nodes does not change). If such a portion were identified, then the dataflow graph may be changed by moving node A adjacent to node B to obtain the portion "AB". As a specific example, if a dataflow graph were to have the nodes ACDB, and the operation A were to commute with the operations C and D, then the dataflow graph may be altered to become "CDAB". In turn, the data processing system may consider whether an optimization rule applies to the portion "AB." For example, if the operation A were a sort and the operation B were a sort, the data processing system may attempt to determine whether these two sorts may be replaced with a single sort as in the example of FIG. 5B.

As another example, the expression "A→( . . . )→B*" may be used to find a portion of the dataflow graph having a node A, a second node B, and one or more nodes between these nodes with which the node B commutes. As a specific example, if a dataflow graph were to have the nodes ACDB, and the operation B were to commute with the operations C and D, then the dataflow graph may be altered to become "ABCD". In turn, the data processing system may consider whether an optimization rule applies to the portion "AB."

As another example, the expression "A→( . . . )→B**" may be used to find a portion of the dataflow graph having a node A, a node B, and one or more nodes (e.g., C and D) between the nodes A and B with which node B does not commute. In that case, the system may try to perform a "pushy" commute, where if possible the nodes C and D would be pushed to the left of the node A. As a specific example, if a dataflow graph were to have the nodes ACEDB, and the operation B were to commute with the operation E but not operations C and D, then the dataflow graph may be altered to become "CDABE"—B commuted with E, but pushed C and D to the left of A.

As yet another example, the expression "A**→( . . . )→B" may be used to find a portion of the dataflow graph having a node A, a node B, and one or more nodes (e.g., C and D) between the nodes A and B with which node A does not commute. In that case, the system may try to perform a "pushy" commute, where if possible the nodes C and D would be pushed to the right of the node B. As a specific example, if a dataflow graph were to have the nodes ACEDB, and the operation A were to commute with the operation E but not operations C and D, then the dataflow graph may be altered to become "EABCD"—node A commuted with E, but pushed C and D to the right of B.

It should be appreciated that the above-described examples of expressions of a subgraph matching language are illustrative. In some embodiments, one or more other expressions may be part of the subgraph matching language in addition to or instead of the above-described examples.

In some embodiments, any one or more of numerous types of optimization rules may be applied when generating the updated dataflow graph from the initial dataflow graph at act 207. For example applying an optimization rule to the initial dataflow graph may involve removing one or more redundant data processing operations, removing one or more unreferenced data processing operations, performing one or more strength reduction optimizations, performing one or more combining operations optimizations, performing one or more width reduction optimizations, and/or performing one or more deduplication optimizations.

In some embodiments, an optimization rule may be embodied in program code that, when executed, causes a corresponding optimization to be performed on a dataflow graph. For example, an optimization rule for removing redundancy may be embodied in program code that, when executed, causes the removal (from the dataflow graph to which the rule is applied) of at least one node representing a data processing operation determined to be redundant. Examples of applying an optimization rule to a dataflow graph to remove one or more redundant data processing operations are illustrated in FIGS. 3A-3C, as described in more detail below.

As another example, an optimization rule for performing a strength reduction may be embodied in program code that, when executed, causes the replacement (in the dataflow graph to which the rule is applied) of a first node representing a first data processing operation (e.g., a node representing a sort data processing operation) with a second node representing a second data processing operation of a weaker type that the first data processing operation (e.g., a node representing a sort-within-groups data processing operation). Examples of applying an optimization rule to a dataflow graph to perform a strength reduction optimization are illustrated in FIGS. 4A and 4B, as described in more detail below.

As another example, an optimization rule for performing a combining operations optimization may be embodied in program code that, when executed, causes the replacement (in the dataflow graph to which the rule is applied) of multiple nodes representing multiple operations with a single node representing the combination of these multiple operations. Examples of applying an optimization rule to a dataflow graph to perform a combining operations optimization are illustrated in FIGS. 5A-5D, as described in more detail below.

Figure 6:
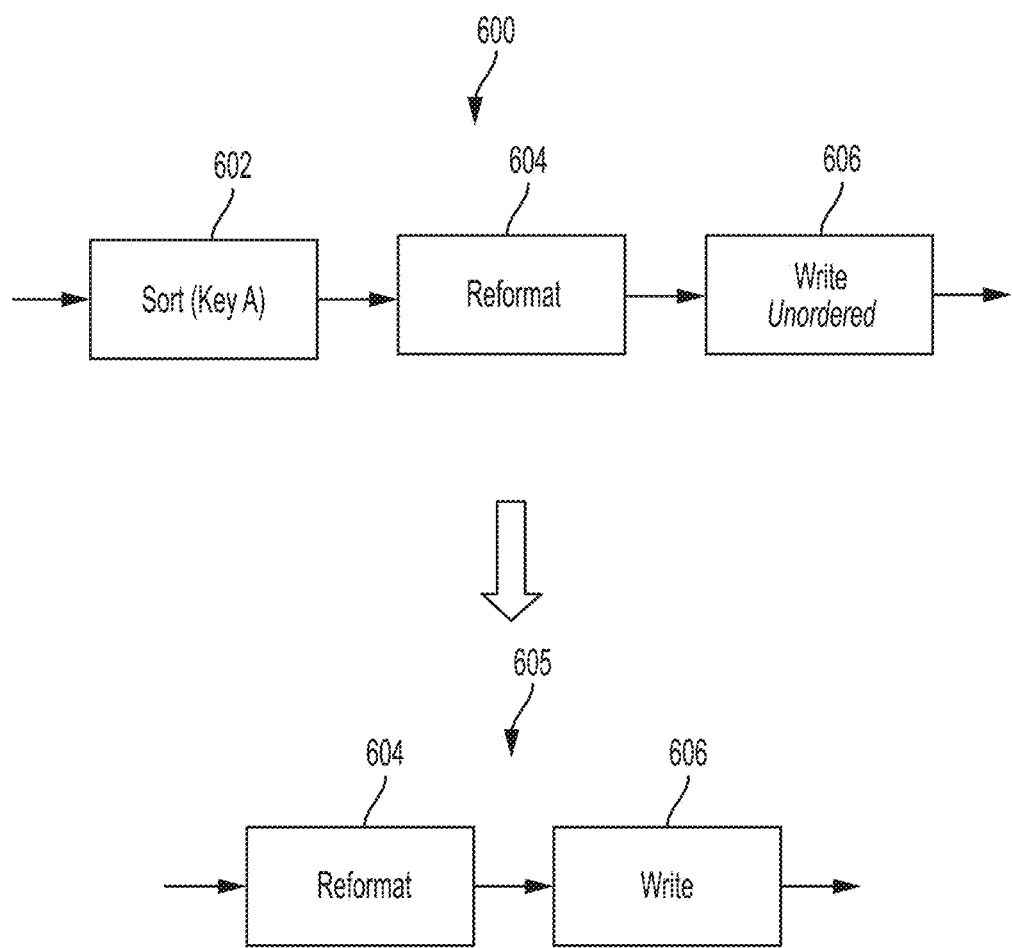
FIG. 6 illustrates applying an optimization rule to an illustrative dataflow graph to remove an unreferenced data processing operation, in accordance with some embodiments of the technology described herein.

As yet another example, an optimization rule for removing one or more unreferenced data processing operations may be embodied in program code that, when executed, causes the removal (from the dataflow graph to which the rule is applied) of at least one node representing a data processing operation whose results are unreferenced and/or unused (e.g., a sort data processing operation that is unreferenced because the order resulting from the sorting is not needed or relied upon in subsequent processing). An example of applying such an optimization rule to a dataflow graph is illustrated in FIG. 6, as described in more detail below.

Figure 7:
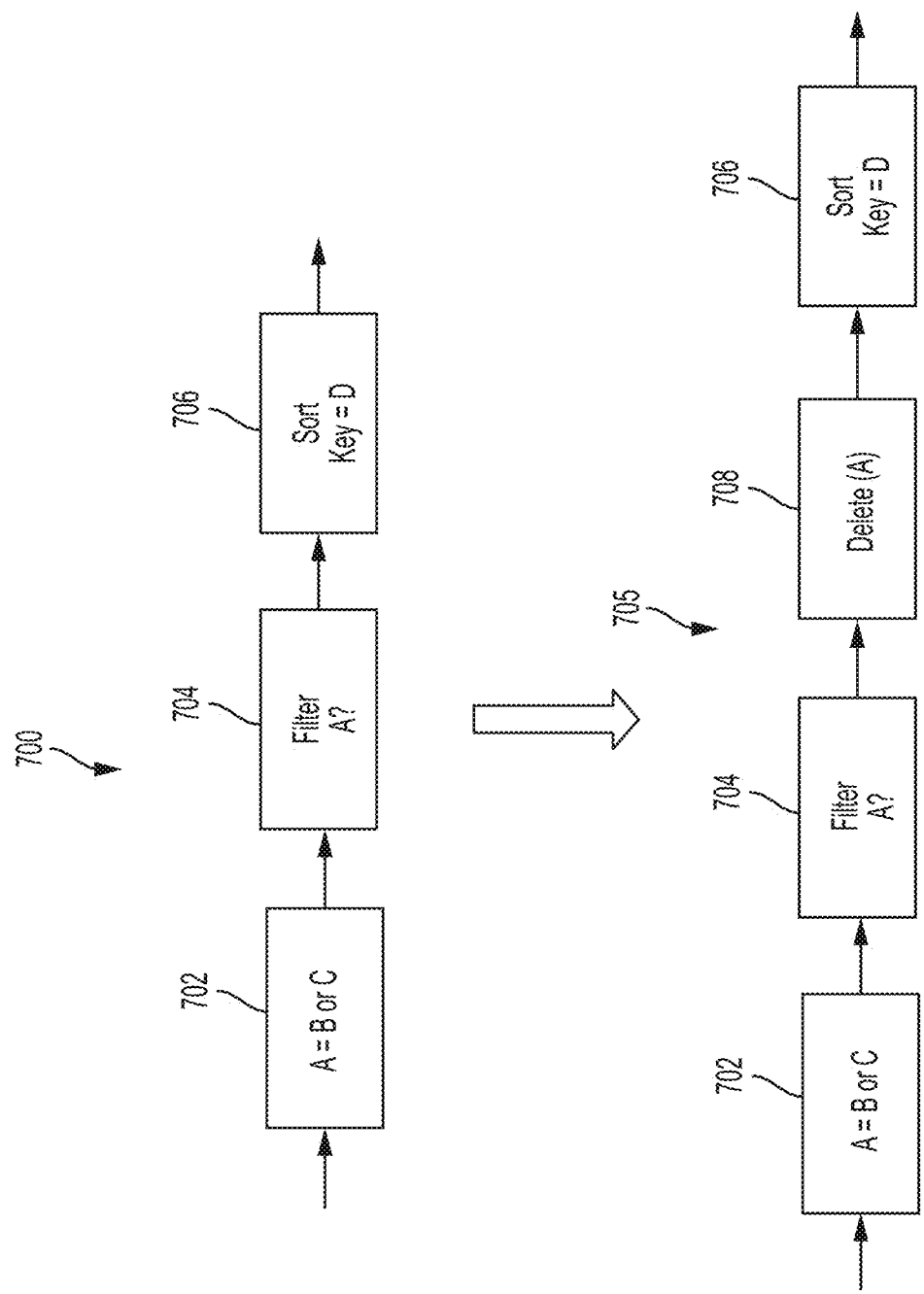
FIG. 7 illustrates applying an optimization rule to an illustrative dataflow graph to perform a width reduction optimization, in accordance with some embodiments of the technology described herein.

As another example, an optimization rule for performing a width-reduction optimization may be embodied in program code that, when executed, causes the some data (e.g., one or more columns of data, rows of data, etc.) to be deleted at a certain portion in the graph prior to the performance of subsequent operations because that data (i.e., the deleted data) is not used in subsequent operations and need not be propagated as part of the processing. An example of applying such an optimization rule to a dataflow graph is illustrated in FIG. 7, as described in more detail below.

Figure 8A:
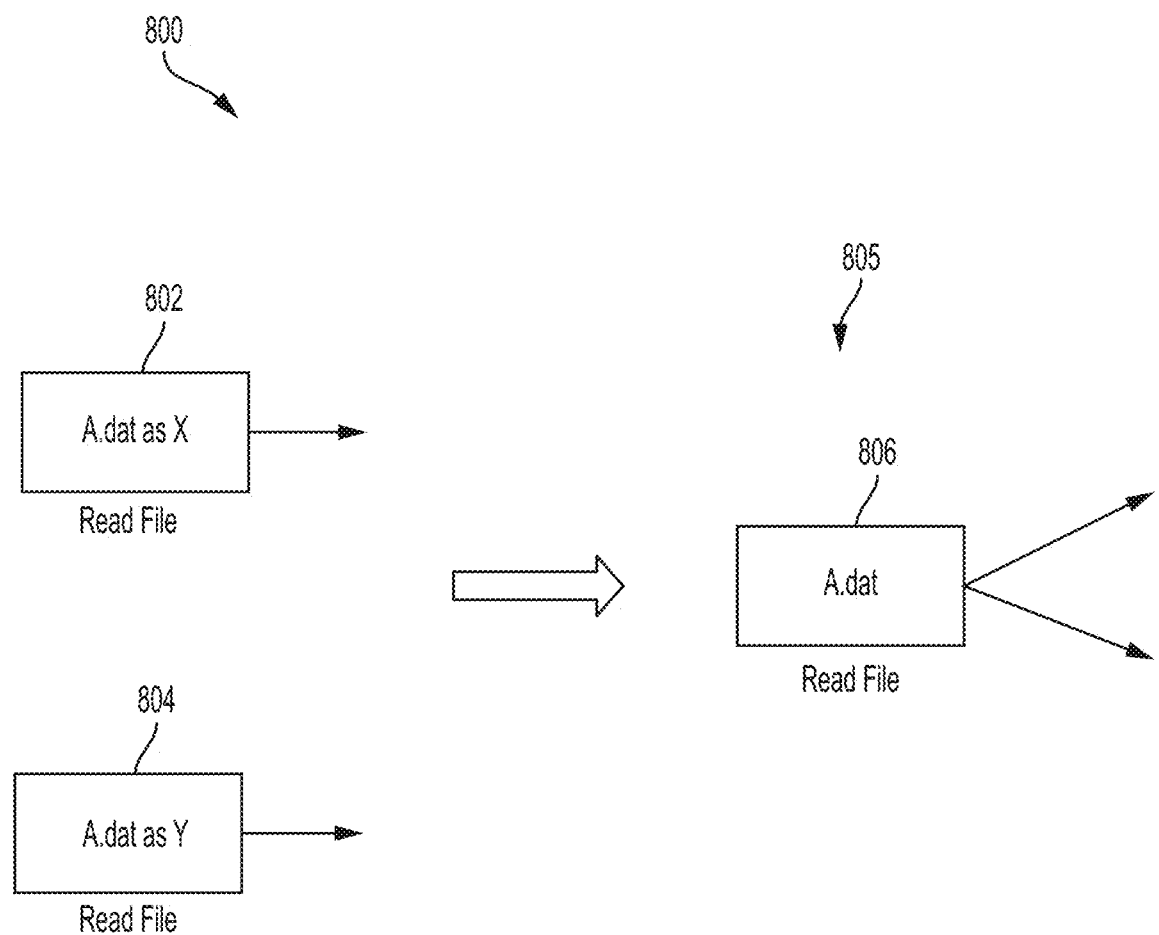
FIG. 8A illustrates applying an optimization rule to an illustrative dataflow graph to perform a deduplication optimization, in accordance with some embodiments of the technology described herein.
Figure 8B:
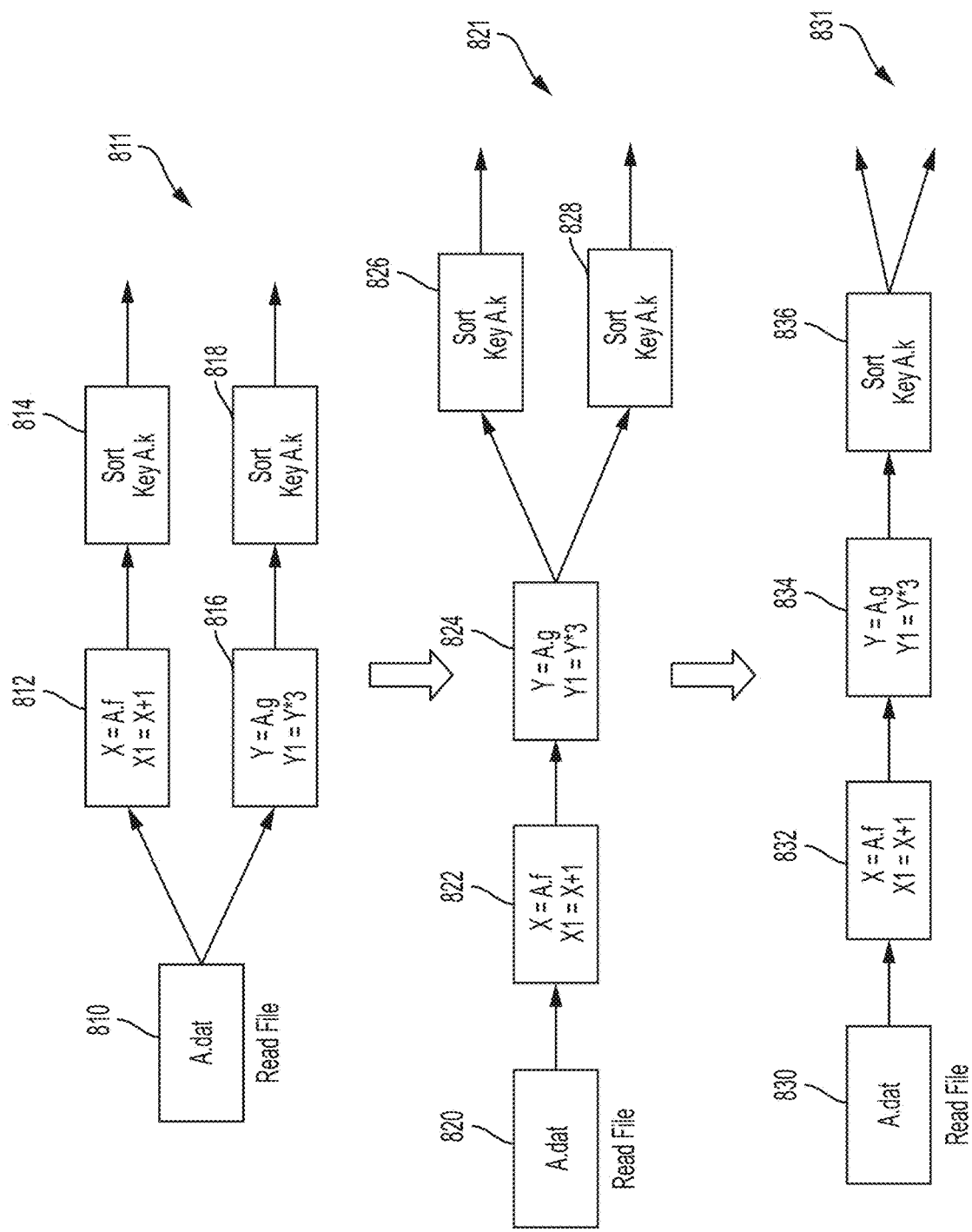
FIG. 8B illustrates applying an optimization rule to an illustrative dataflow graph to perform a deduplication optimization with zippering, in accordance with some embodiments of the technology described herein.

As another example, an optimization rule for performing a deduplication optimization may be embodied in program code that, when executed, causes different branches of the dataflow graph to which the rule is applied to be merged. Examples of applying such an optimization rule to a dataflow graph are illustrated in FIGS. 8A and 8B, as described in more detail below.

Figure 9:
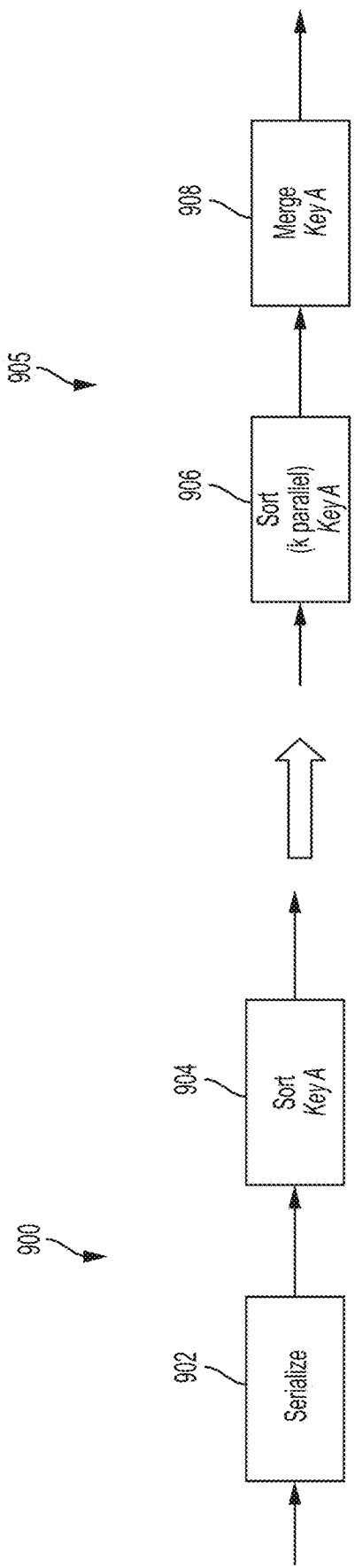
FIG. 9 illustrates applying an optimization rule to an illustrative dataflow graph to perform a serial to parallel optimization, in accordance with some embodiments of the technology described herein.

As another example, an optimization rule for performing a serial-to-parallel optimization may be embodied in program code that, when executed, causes processing that is performed serially to be performed in parallel. An example of applying such an optimization rule to a dataflow graph is illustrated in FIG. 9, as described in more detail below.

It should be appreciated that the optimization rules and optimizations described above are illustrative non-limiting examples. As part of process 200, one or more other optimization rules and/or optimizations may be applied to the initial data flow graph instead of or in addition to the above-describe optimization rules and/or optimizations.

Next process 200 proceeds to act 216, where the updated dataflow graph is output. In some embodiments, at act 216, the updated dataflow graph may be stored in (e.g., in non-volatile memory) for subsequent use.

In addition to or instead of being stored, the updated dataflow graph may be executed. In some embodiments, in which the updated dataflow graph is executed, processing layouts are assigned to one or more nodes of the updated dataflow graph at act 218 of process 200. The processing layout for a node representing a data processing operation may specify how many computing devices are to be used for performing the data processing operation and may identify the particular computing devices to be used to perform the data processing operation. This may be done in any suitable way including by using any of the layout assignment techniques described in U.S. patent application Ser. No. 15/939,829, titled "Systems and Methods for Performing Data Processing Operations Using Variable Level Parallelism", filed on Mar. 29, 2018, which is incorporated by reference herein in its entirety. In some embodiments, the determination of whether nodes are processed using a single or multiple computing devices (e.g., whether parallel processing is to be applied and what level of parallelism is to be employed) may be made earlier (e.g., during act 207), with specific computing devices to be used for the computations being assigned at act 218.

After the processing layouts are assigned at act 218, the updated dataflow graph may be executed. For example, when process 200 is performed by data processing system, the data processing system 100 may execute the updated dataflow graph using the graph execution engine 115. In some embodiments, the updated dataflow graph generated at act 207 may be executed as soon as it is generated and without any user input. In other embodiments, the updated dataflow graph may be generated at act 207, but its execution may begin only in response to a command to do so, which command may be provided by a user through an interface or by another computer program (e.g., through an API call).

It should be appreciated that process 200 is illustrative and that there are variations. For example, in some embodiments, optional acts 218 and 220 may be omitted and process 200 may complete after the updated dataflow graph is generated and stored. As another example, process 200 may be used to optimize a dataflow graph provided from another source (e.g., another data processing system) rather than a dataflow graph generated from an input SQL query as is the case in the illustrated embodiment. In such embodiments, acts 202-204 may be omitted and the initial dataflow graph may be generated, at act 206, from a dataflow graph provided from another source. Such generation may involve transforming the received dataflow graph into one that is configured for use with the data processing system executing process 200.

Illustrative examples of applying optimization rules to dataflow graphs are provided below with reference to FIGS. 3A-9. Each of the dataflow graphs shown in these figures may be a subgraph of a larger dataflow graph being optimized (e.g., as part of act 207 of process 200). For example, each of one or more of the dataflow graphs shown in these figures may be a subgraph of the initial dataflow graph generated at act 206 of process 200 and/or a subgraph of one or more dataflow graphs obtained by transforming the initial dataflow graph as part of act 207.

FIG. 3A illustrates applying an optimization rule to an illustrative dataflow graph 300 to remove one or more redundant data processing operations. As shown in FIG. 3A, the dataflow graph 300 includes node 302 representing the repartition data processing operation (which partitions data for parallel processing on different computing devices) followed by node 304 representing the serialize operation (which operates to combine all the data for serial processing by a single computing device). Since the effect of repartitioning will be nullified by the subsequent serialize command, it is not necessary to perform the repartitioning data processing operation. Accordingly, a dataflow graph optimizer (e.g., graph optimizer 110 in data processing system 100) may remove the node 302 representing the repartitioning operation. As a result, the portion 300 of a dataflow graph is transformed into portion 305.

FIG. 3B illustrates changing the order of commuting data processing operations to facilitate application of an optimization rule to another illustrative dataflow graph, in accordance with some embodiments of the technology described herein. As shown in FIG. 3B, the data flow graph 310 includes node 311 representing a sort data processing operation (the sort being performed on key A), followed by one or more nodes (not shown), followed by node 312 representing another sort data processing operation (the sort being performed on key B). In this example, determining whether the sort operation represented by node 311 commutes with the data processing operation(s) represented by the nodes between nodes 311 and 312 may facilitate the application of one or more optimization rules to the data flow graph 310. For example, if the sort operation represented by node 311 commutes with the data processing operation(s) represented by the nodes between nodes 311 and 312, then changing the order of the nodes allows for the placement of nodes 311 and 312 adjacent to one another as shown in dataflow graph 313. In turn, this allows consideration of whether one or more optimization rules may be applied to the resulting graph 313 (which rules may not have been applicable to data flow graph 310 prior to changing the order of where the sort operation represented by node 311 appears in the graph). For example, in this case, the effect of sorting on key A (node 311) is nullified by the subsequent resorting on key B (node 312). Thus, the sort operation represented by node 311 is unnecessary and the node may be removed, as shown in FIG. 3C, resulting in dataflow graph 314.

Figure 3D:
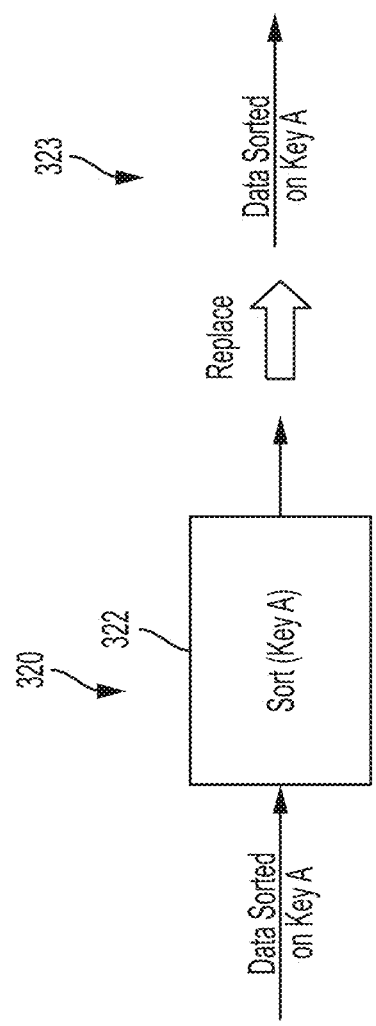
FIG. 3D illustrates applying an optimization rule to yet another illustrative dataflow graph to remove one or more redundant data processing operations, in accordance with some embodiments of the technology described herein.

FIG. 3D illustrates applying an optimization rule to another illustrative dataflow graph 320 to remove a redundant data processing operation. As shown in FIG. 3D, the dataflow graph 320 includes node 322 representing a sort operation on key A. However, when the data is already sorted on that same key, a dataflow graph optimizer may remove the node 322 representing the sort operation on key A, resulting in dataflow graph 323. In all of the examples shown in FIGS. 3A-3D, the removal of redundant nodes results in a dataflow graph the execution of which consumes fewer computing resources than if such nodes were not removed.

FIG. 4A illustrates applying an optimization rule to an illustrative dataflow graph 400 to perform a strength reduction optimization and obtain dataflow graph 402. As shown in FIG. 4A, dataflow graph 400 contains node 401 representing a sort operation for sorting the incoming data on major key A (e.g., sort by last name) and then minor key B (e.g., sort people having the same last name by first name). However, when the graph optimizer detects that the data coming into node 401 is already sorted on key A (e.g., already sorted by last name), the graph optimizer may perform a strength reduction optimization by replacing the sort operation by the sort-within-groups operation (represented by node 403 in graph 402), thereby reducing the strength of the sorting operation, but obtaining the same result and avoiding performing unnecessary computations.

FIG. 4B illustrates applying an optimization rule to an illustrative dataflow graph 410 to perform another strength reduction optimization and obtain dataflow graph 412. As shown in FIG. 4B, dataflow graph 410 contains node 411 representing a rollup operation to be performed on major key A and minor key B. However, when the graph optimizer detects that the data coming into node 411 is already sorted on key A, the optimizer may perform a strength reduction optimization by replacing the rollup operation by the grouped rollup operation (represented by node 413 in graph 412), thereby reducing the strength of the rollup operation, but obtaining the same result and avoiding performing unnecessary computations.

FIG. 5A illustrates applying an optimization rule to an illustrative dataflow graph 500 to perform a combining operations optimization. As shown in FIG. 5A, dataflow graph 500 includes a sequence of nodes 502, 504, and 506 each representing respective calculations. In some embodiments, during execution of a dataflow graph, data processing operations represented by separate nodes may be executed by different processes running on one or multiple computing devices. A graph optimizer may perform a combining operations optimization by replacing the sequence of three nodes with a single node (e.g., node 508 in dataflow graph 505) so that all the operations are performed by a single process executing on a single computing device, which reduces the overhead of inter-process (and potentially inter-device) communication.

FIG. 5B illustrates applying an optimization rule to another illustrative dataflow graph to 510 perform a combining operations optimization. As shown in FIG. 5B, dataflow graph 510 includes node 512, which represents a join operation on datasets A and B using keys A1 and B1, followed by node 514, which represents a join operation on the output of the join operation represented by node 512 and dataset C using keys A1 and C1. In this example, a graph optimizer may perform a combining operations optimization by replacing the two separate nodes representing respective join operations by a single node representing a join operation on datasets A, B, and C using keys A1, B1, and C1, as shown with node 516 in dataflow graph 515. In this way, the join processing is performed by a single process executing on a single computing device, which reduces the overhead of inter-process (and potentially inter-device) communication.

Figure 5C:
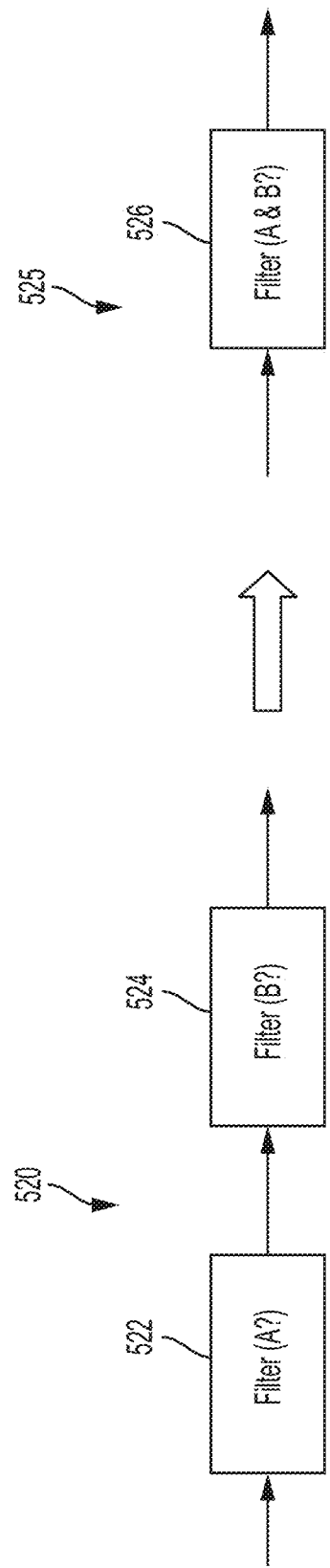
FIG. 5C illustrates applying an optimization rule to yet another illustrative dataflow graph to perform a combining operations optimization, in accordance with some embodiments of the technology described herein.

FIG. 5C illustrates applying an optimization rule to another illustrative dataflow graph 520 to perform a combining operations optimization. As shown in FIG. 5C, dataflow graph 520 includes node 522, which represents a filtering operation on key A, followed by node 524, which represents another filtering operation on key B. In this example, a graph optimizer may perform a combining operations optimization by replacing the two separate nodes 522 and 524 representing respective filter operations by a single node representing a filter operation that filters on both keys A and B, as shown with node 526 in dataflow graph 525. In this way, the filtering is performed by a single process executing on a single computing device, which reduces the overhead of inter-process (and potentially inter-device) communication.

Figure 5D:
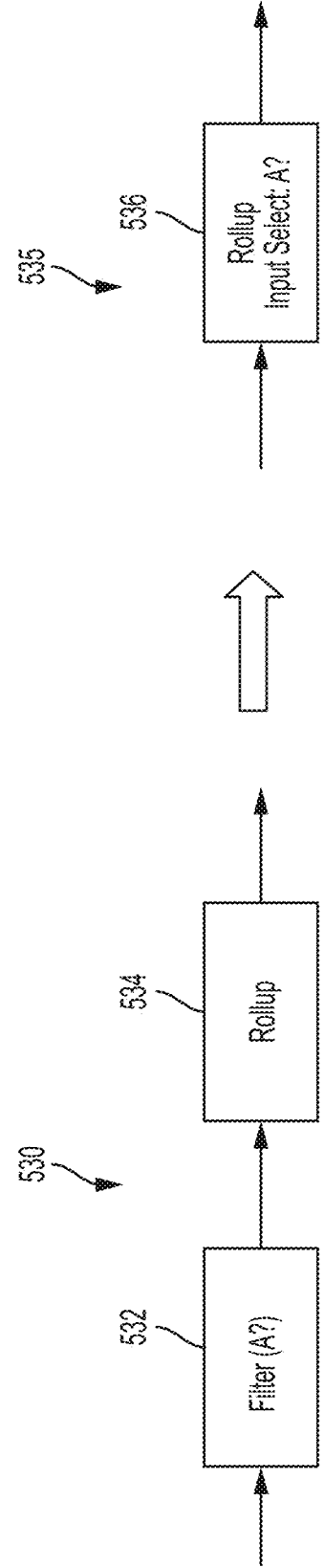
FIG. 5D illustrates applying an optimization rule to yet another illustrative dataflow graph to perform a combining operations optimization, in accordance with some embodiments of the technology described herein.

FIG. 5D illustrates applying an optimization rule to another illustrative dataflow graph 530 to perform a combining operations optimization. As shown in FIG. 5D, dataflow graph 530 includes node 532 representing a filtering operation on key A, followed by node 534 representing a rollup operation. In this example, a graph optimizer may perform a combining operations optimization by replacing the two separate nodes 522 and 524 by a single node representing a rollup operation that processes input selected on key A, as shown with node 536 in dataflow graph 535. In this way, a single process executing on a single device can perform the equivalent of the rollup and filtering operations, which reduce the overhead of inter-process (and potentially inter-device) communication.

FIG. 6 illustrates applying an optimization rule to an illustrative dataflow graph 600 to remove an unnecessary data processing operation. As shown in FIG. 6, dataflow graph 600 includes node 602, which represents a sort operation with respect to key A, followed by node 604 that represents a reformat command, followed by 606 which represents an unordered write command. In cases where the write command is unordered, and therefore the order imposed on the data by the sort operation represented by node 602 is not preserved through the write operation, a graph optimizer may remove the node representing the sort operation, which results in dataflow graph 605.

FIG. 7 illustrates applying an optimization rule to an illustrative dataflow graph 700 to perform a width reduction optimization, in accordance with some embodiments of the technology described herein. As shown in FIG. 7, dataflow graph 700 includes node 702, which sets the values of a data column A as a logical "or" of the data stored in columns B and C, followed by node 704, which represents a filtering operation on the data column A provided by node 702, and node 706 which represents a sorting operation using the key D. After the filtering operation, the data column A may not be used in downstream computations. Accordingly, in some embodiments, a graph optimizer may perform a width reduction optimization by removing the data in data column A (e.g., by the introduction of a node to delete these data from the data moving along the links between nodes as shown with node 708 in dataflow graph 705) so that it is not further propagated. This reduces the amount of computational resources needed to carry data through subsequent computations (e.g., by reducing network, memory, and processing resources utilized) downstream of node 704 in the dataflow graph 705.

FIG. 8A illustrates applying an optimization rule to an illustrative dataflow graph 800 to perform a deduplication optimization. As shown in FIG. 8A, dataflow graph 800 includes nodes 802 and 804 both of which represent reading operations from the same underlying file (A.dat). A graph optimizer may perform a deduplication optimization by replacing both such nodes with a single node (e.g., as shown by node 806 in dataflow graph 805) so that the data is read only once. Even if the data is subsequently used by different portions of the dataflow graph 805, not reading in the same data twice reduces the amount of computing resources used to access the data.

FIG. 8B illustrates applying an optimization rule to an illustrative dataflow graph 811 to perform a deduplication optimization with zippering. As shown in FIG. 8B, dataflow graph 811 includes node 810 representing the data processing operation of reading data from a file called "A.dat". The data is then processed in two different branches. The first branch contains nodes 812 (pulls out a column of data "A.f" and adds "1" to the data in that column) and 814 (sorts the data on column "A.k"). The second branch contains nodes 816 (pulls out a column of data "A.g" and multiplies the data in that column by 3) and 818 (sorts the data on column "A.k"). In the example of FIG. 8A, deduplication involved removing nodes that performed identical processing (reading the same data form the same file). In the example of FIG. 8B, however, the processing performed by the different branches of graph 811 is not identical. However, the processing performed in the different branches is sufficiently similar that may can be folded together into a single path. The folding may be performed by combining the paths left-to-right (akin to how a zipper connects two sides).

In this example, a graph optimizer may alter graph 811 such that the calculations represented by nodes 812 and 816 are performed serially (rather than in parallel). The result is shown in dataflow graph 821. Next, the graph optimizer may alter graph 821 so that the nodes 826 and 828 representing respective sort operations are combined into a single node 836. The result is shown in dataflow graph 831. As can be seen, the number of nodes in graph 831 is reduced relative to graph 811, and processing of the same data can be performed in the same locations thereby reducing computational resources required. In addition, further optimizations may be applied to the resulting graph 831, for example, by combining the operations represented by nodes 832 and 834 into a single node.

FIG. 9 illustrates applying an optimization rule to an illustrative dataflow graph 900 to perform a serial to parallel optimization. As shown in FIG. 9, dataflow graph 900 includes node 902, which represents a serialize operation applied to data previously processed across k multiple computing devices, and node 904, which represents a sorting (on key A) operation. In some embodiments, the dataflow graph optimizer may alter the dataflow graph such that one or more operations being applied to serialized data are instead applied in a parallelized manner. In this example, the dataflow graph optimizer may alter graph 900 to remove the serialize operation and allow sorting to be applied in a k-wise parallel manner, as shown using node 906 in dataflow graph 905. The results of the k parallel sorts may then be combined using the merge operation, as shown using node 908 in dataflow graph 905.

Figure 10A:
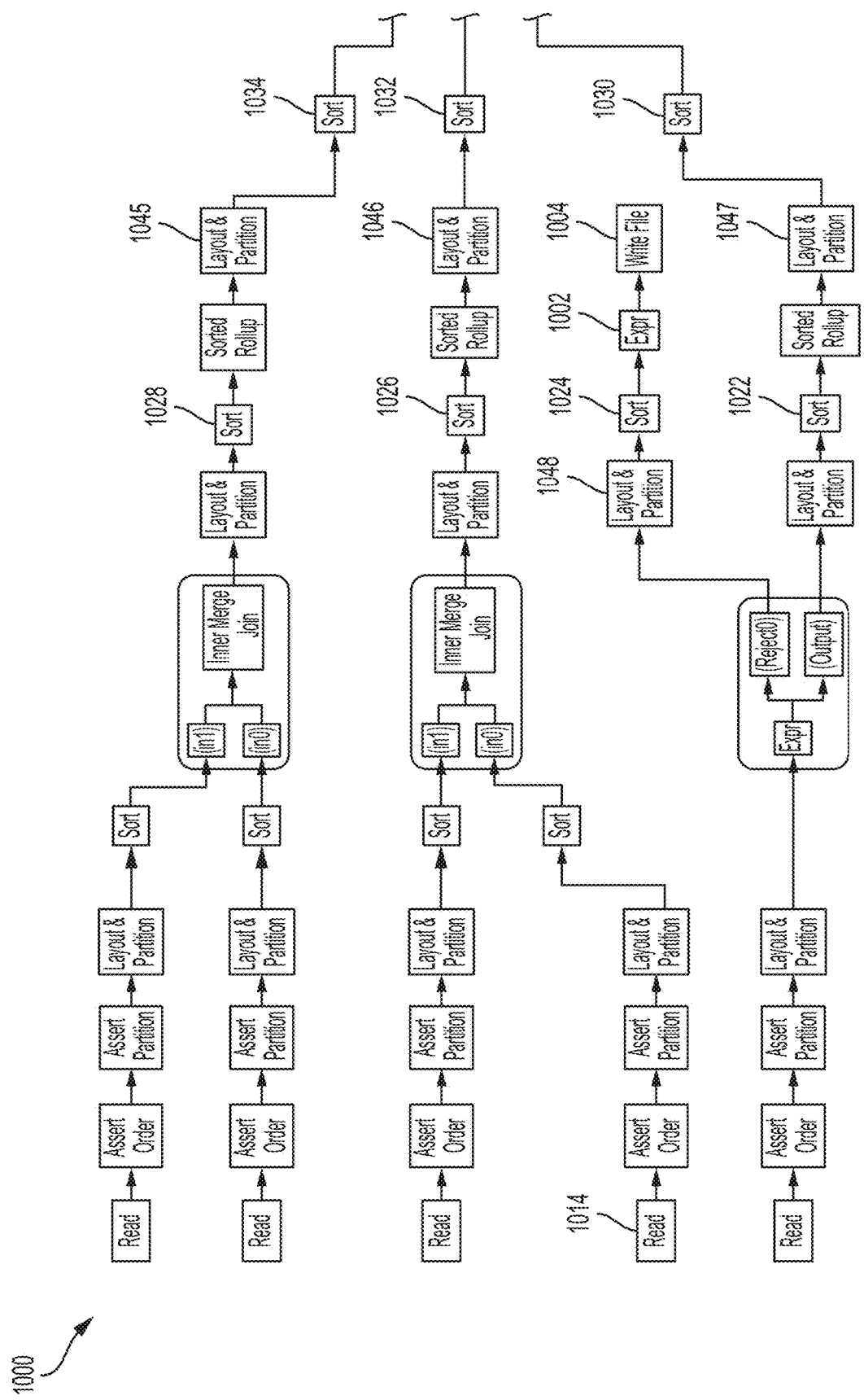
FIG. 10A illustrates an initial dataflow graph, in accordance with some embodiments of the technology described herein.
Figure 10A:
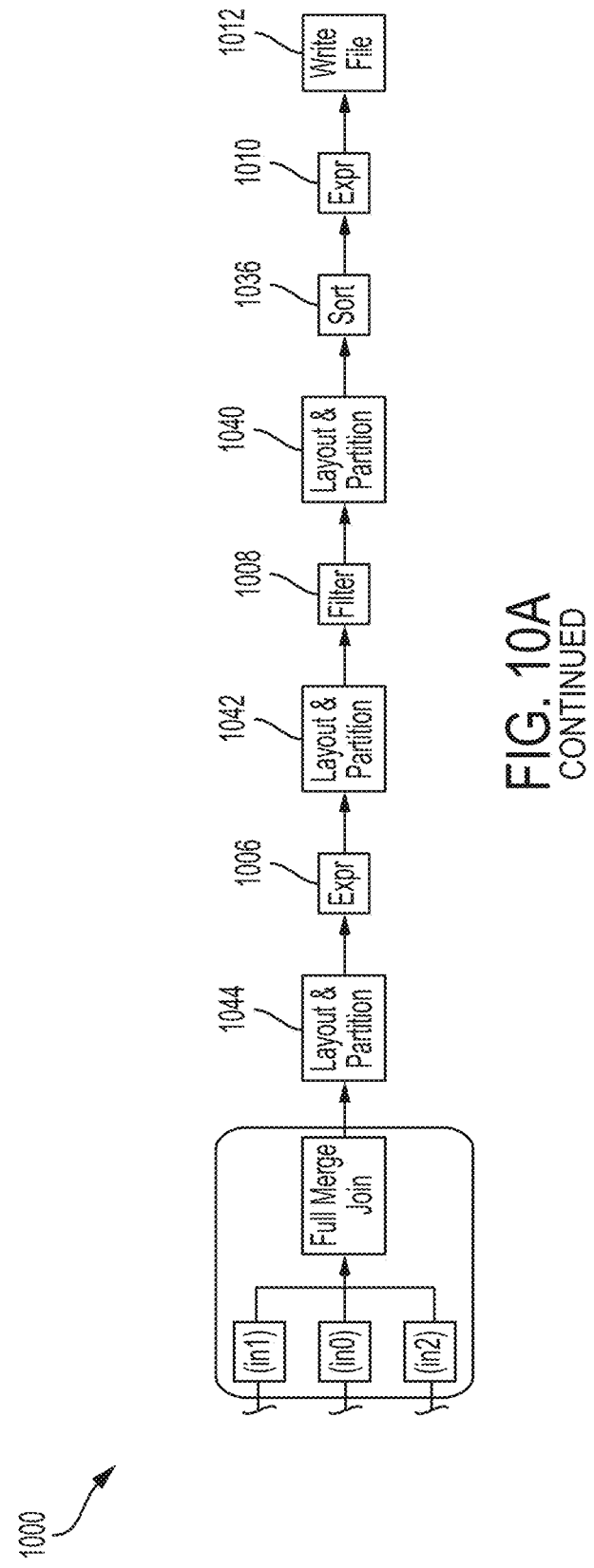
Figure 10B:
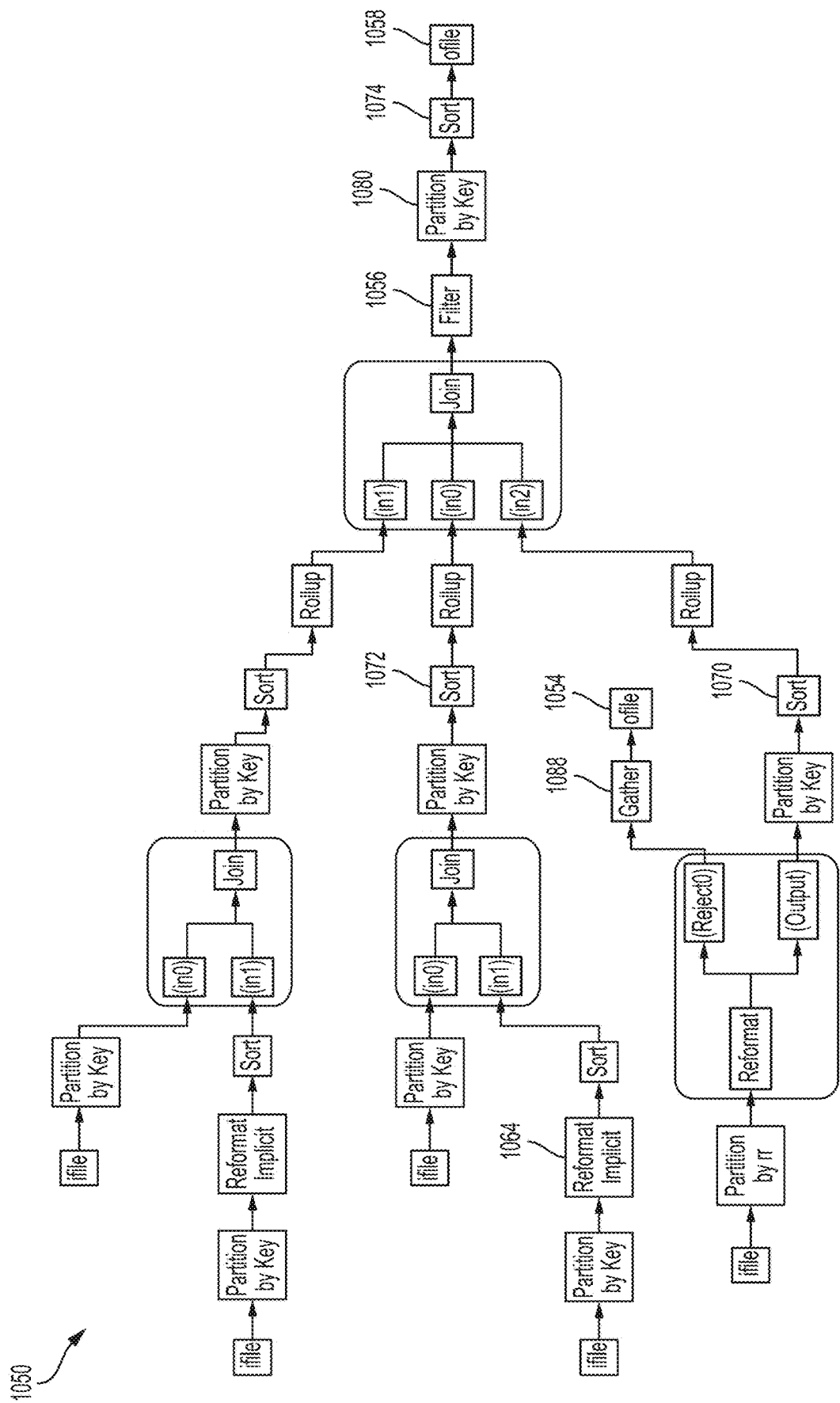
FIG. 10B illustrates an updated dataflow graph obtained by iteratively applying optimization rules to the initial dataflow graph shown in FIG. 10A, in accordance with some embodiments of the technology described herein.

FIG. 10A illustrates an initial dataflow graph 1000, in accordance with some embodiments of the technology described herein. FIG. 10B illustrates an updated dataflow graph 1050 obtained by iteratively applying optimization rules to the initial dataflow graph shown in FIG. 10A, in accordance with some embodiments of the technology described herein. As may be seen by comparing the initial dataflow graph 1000 of FIG. 10A and updated dataflow graph 1050 of FIG. 10B, the updated dataflow graph has fewer nodes and links than does the initial dataflow graph and may be executed more efficiently than the initial dataflow graph. Detailed below are a number of the optimizations applied to the initial dataflow graph 1000 in accordance with some embodiments of the technology described herein.

In the illustrative example of FIGS. 10A and 10B, multiple combining operations optimizations are applied to the initial dataflow graph 1000 of FIG. 10A in order to generate updated dataflow graph 1050 of FIG. 10B. For example, the data processing operation ("expr", which may be an expression for performing any suitable computation on the data flowing through node 1002, and in this case is formatting data for output) represented by node 1002 and the write data processing operation ("write_file") represented by node 1004 are combined using a combining operations optimization during generation of updated dataflow graph 1050, which contains node 1054 configured to perform both of these data processing operations. As another example, the data processing operation ("expr") represented by node 1006 and the filter data processing operation ("filter") represented by node 1008 are combined using a combining operations optimization during generation of updated dataflow graph 1050, which contains node 1056 configured to perform both of these data processing operations. As yet another example, the data processing operation ("expr") represented by node 1010 and the write data processing operation ("write_file") represented by node 1012 are combined using a combining operations optimization during generation of updated dataflow graph 1050, which contains node 1058 configured to perform both of these data processing operations. As discussed herein, in some embodiments, because data processing operations associated with a single dataflow graph node are performed by a single process executing on a single computing device, combining nodes reduces the overhead of inter-process (and potentially inter-device) communication, which improves the performance of the data processing system.

In the illustrative example of FIGS. 10A and 10B, multiple optimizations for reducing redundancy are applied to the initial dataflow graph 1000 of FIG. 10A in order to generate updated dataflow graph 1050 of FIG. 10B. For example, the sort operations represented by nodes 1030, 1032, and 1034 in the initial dataflow graph 1000 are removed and have no counterparts in the updated dataflow graph 1050. These sort operations are removed because the data coming into these nodes has already been sorted by sorting operations applied via nodes 1022, 1026, and 1028, respectively. The sorted order applied via processing at nodes 1022, 1026, and 1028 is preserved by subsequent data processing operations (e.g., the sorted rollup operations) and the sorted order of the data is maintained such that further sorting at nodes 1030, 1032, and 1034 is not necessary. Accordingly, the nodes 1030, 1032, and 1034 are removed during generation of the updated dataflow graph 1050. On the other hand, the sorting operations represented by nodes 1022, 1026, and 1028 are preserved. For example, nodes 1022 and 1026 in the initial dataflow graph 1000 correspond to nodes 1070 and 1072 in the updated dataflow graph 1050. By contrast, the sort operation represented by node 1036 is preserved (node 1074 is the corresponding node in updated dataflow graph 1050) because it is not redundant as the preceding full outer merge join operation does not preserve sortedness.

FIGS. 10A and 10B also illustrate another example of removing an unnecessary data processing operation. As shown in FIG. 10A, the initial dataflow graph 1000 includes node 1024, which represents a sort operation eventually followed by node 1004, which represents an unordered write command. In cases where the write command is unordered, and therefore the order imposed on the data by the sort operation represented by node 1024 is not preserved through the write operation, the node 1024 representing the sort operation may be removed. As can be seen from FIG. 10B, there is no sort operation corresponding to node 1024—that operation has been removed.

As yet another example of removing unnecessary data processing operations, the initial dataflow graph 1000 includes layout and partition operations represented by nodes 1040, 1045, 1046, and 1047, which are redundant because each of them is preceded by a respective layout and partition node and the layout does not otherwise change. Accordingly, these nodes are removed from initial dataflow graph 1000—no corresponding nodes are present in dataflow graph 1050. In related optimizations, applied to initial dataflow graph 1000, the layout and partition operation represented by node 1048 is replaced by a gather operation represented by node 1088. By contrast, the layout and partition data processing operation represented by node 1044 is retained because it is not redundant; it is responsible for establishing the final partitioning and layout, and results in node 1080 partition_by_key in the final graph 1050.

FIGS. 10A and 10B also illustrate an example of a width reduction optimization. The number of columns of data processed using the read data processing operation represented by node 1014 is reduced, as can be seen by the introduction of the "reformat_implicit" node 1064 shown in the updated dataflow graph 1050 of FIG. 10B. In this example, the graph optimizer detects that a number of columns of read in data would not be subsequently used by determining which columns are to be written out by the write operation represented by node 1012.

Figure 10C:
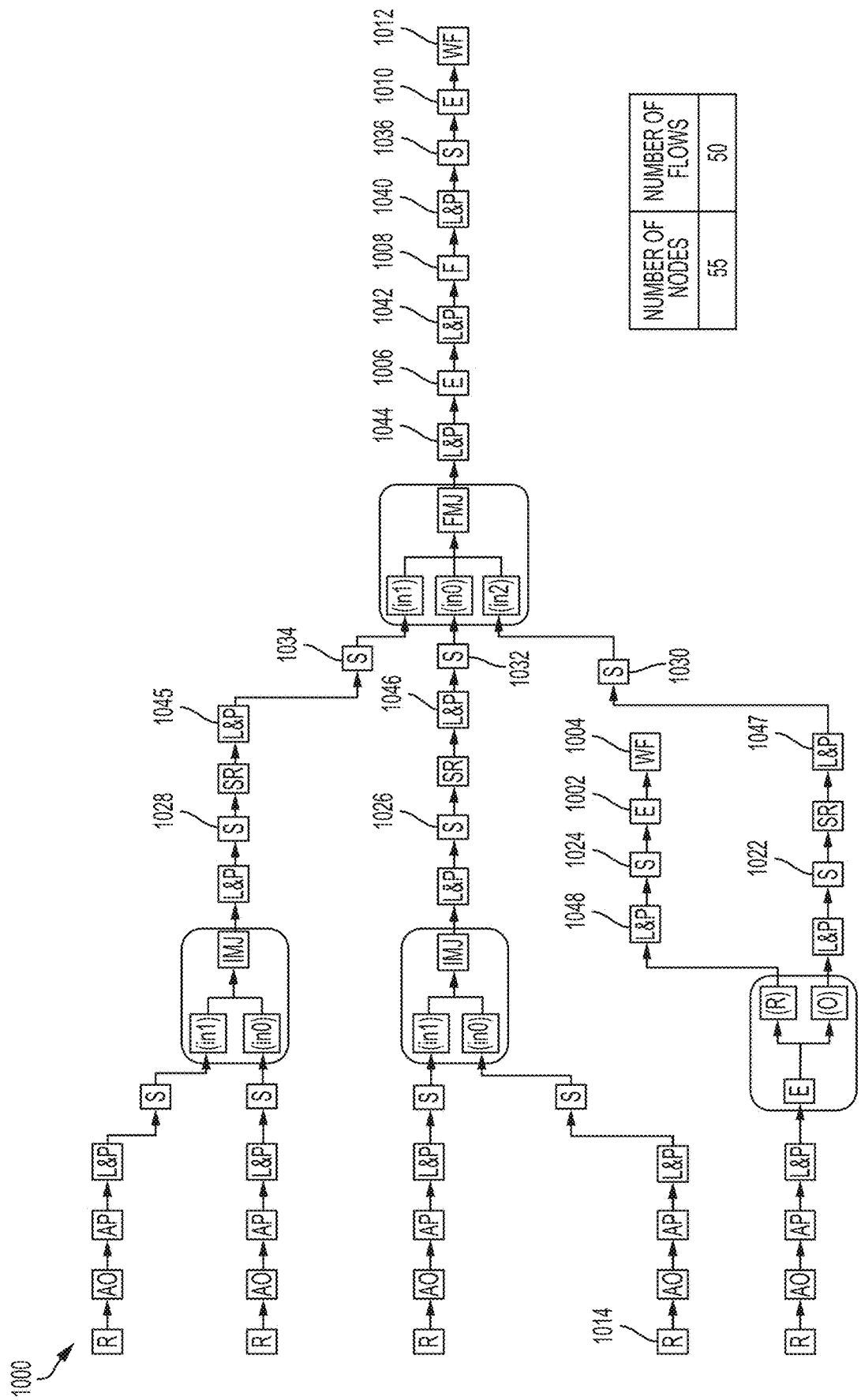
FIG. 10C illustrates another view of the initial dataflow graph of FIG. 10A, in accordance with some embodiments of the technology described herein.
Figure 10D:
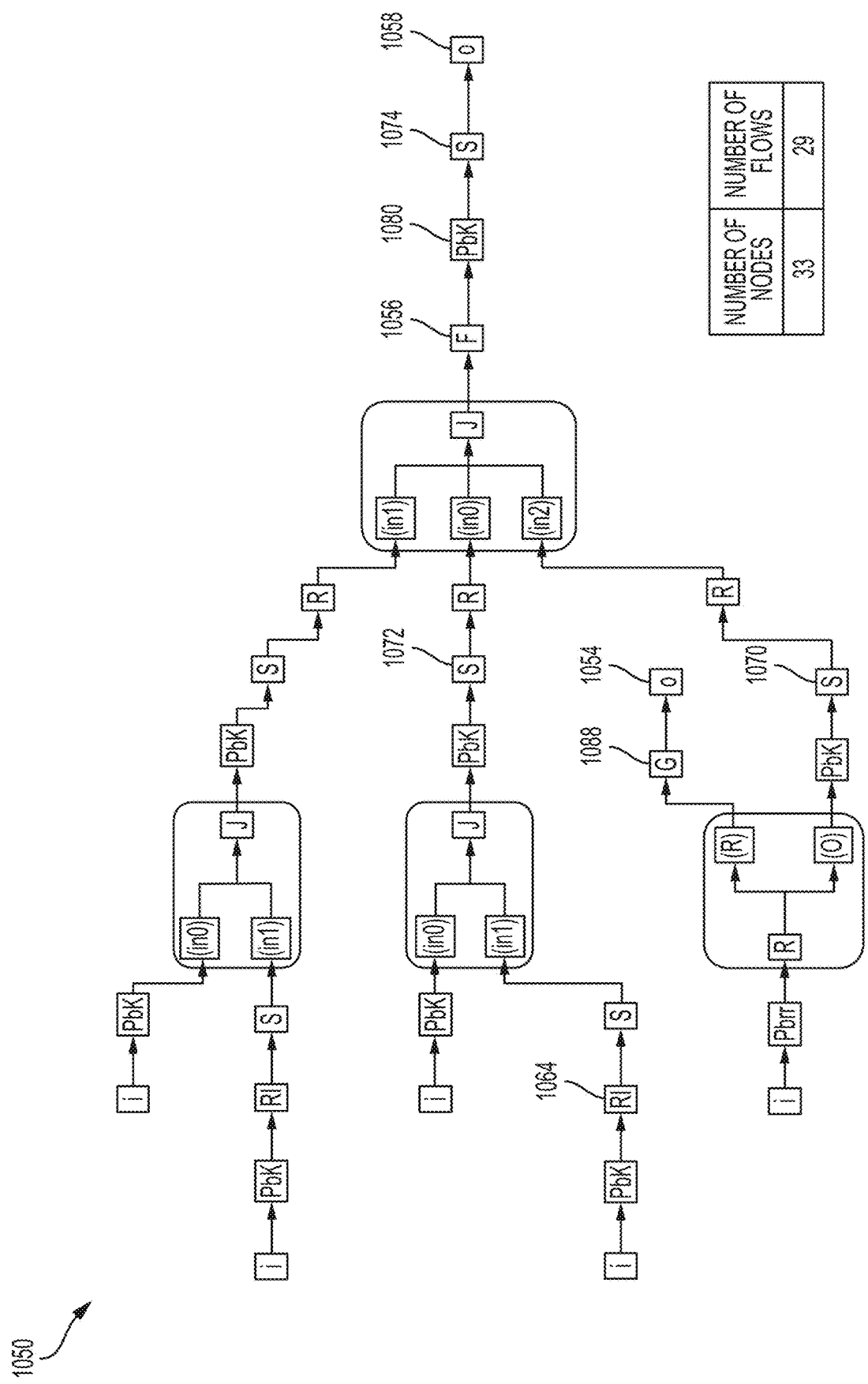
FIG. 10D illustrates another view of the updated dataflow graph of FIG. 10B, in accordance with some embodiments of the technology described herein.

FIG. 10C illustrates another view of the initial dataflow graph 1000 of FIG. 10A, in accordance with some embodiments of the technology described herein. In this view, the labels of the dataflow graph nodes have been replaced by their acronyms. Similarly, FIG. 10D illustrates another view of the updated dataflow graph of FIG. 10B, in which view the labels of the dataflow graph nodes have been replaced by their acronyms.

Figure 11:
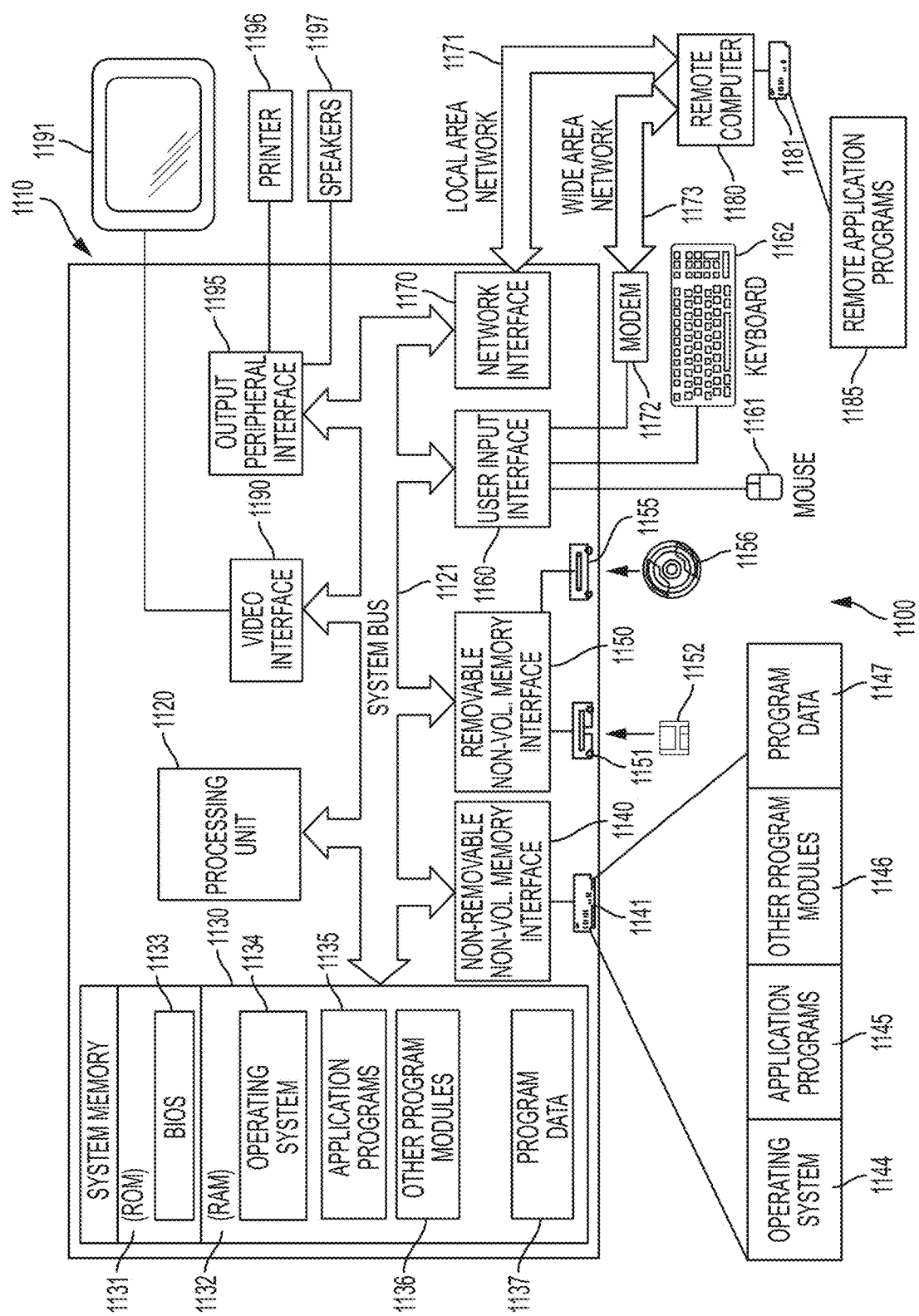
FIG. 11 is a block diagram of an illustrative computing system environment that may be used in implementing some embodiments of the technology described

FIG. 11 illustrates an example of a suitable computing system environment 1100 on which the technology described herein may be implemented. The computing system environment 1100 is only one example of a suitable computing environment and is not intended to suggest any limitation as to the scope of use or functionality of the technology described herein. Neither should the computing environment 1100 be interpreted as having any dependency or requirement relating to any one or combination of components illustrated in the exemplary operating environment 1100.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 11, an exemplary system for implementing the technology described herein includes a general purpose computing device in the form of a computer 1110. Components of computer 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1110 typically includes a variety of computer readable media. Computer readable media can be any available media that can be accessed by computer 1110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1036, and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a flash drive 1151 that reads from or writes to a removable, nonvolatile memory 1152 such as flash memory, and an optical disk drive 1155 that reads from or writes to a removable, nonvolatile optical disk 1156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 11, provide storage of computer readable instructions, data structures, program modules and other data for the computer 1110. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137. Operating system 1144, application programs 1145, other program modules 1146, and program data 1147 are given different numbers here to illustrate that, at a minimum, they are different copies. A user may enter commands and information into the computer 1110 through input devices such as a keyboard 1162 and pointing device 1161, commonly referred to as a mouse, trackball or touch pad. Other input devices (not shown) may include a microphone, joystick, game pad, satellite dish, scanner, or the like. These and other input devices are often connected to the processing unit 1120 through a user input interface 1160 that is coupled to the system bus, but may be connected by other interface and bus structures, such as a parallel port, game port or a universal serial bus (USB). A monitor 1191 or other type of display device is also connected to the system bus 1121 via an interface, such as a video interface 1190. In addition to the monitor, computers may also include other peripheral output devices such as speakers 1197 and printer 1196, which may be connected through an output peripheral interface 1195.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to the computer 1110, although only a memory storage device 1181 has been illustrated in FIG. 11. The logical connections depicted in FIG. 11 include a local area network (LAN) 1171 and a wide area network (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the user input interface 1160, or other appropriate mechanism. In a networked environment, program modules depicted relative to the computer 1110, or portions thereof, may be stored in the remote memory storage device. By way of example, and not limitation, FIG. 11 illustrates remote application programs 1185 as residing on memory device 1181. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. At least one non-transitory computer-readable storage medium storing processor-executable instructions that, when executed by at least one computer hardware processor of a data processing system configured to read data from and/or write data to one or more data stores comprising one or more data sources and one or more data sinks and comprising a graph optimizer and a graph execution engine, cause the at least one computer hardware processor to perform:
   obtaining an input structured query language (SQL) query or an input dataflow graph;
   automatically generating, from the input SQL query or the input dataflow graph, an initial data structure embodying an initial dataflow graph, the initial dataflow graph comprising a first plurality of nodes representing a first plurality of data processing operations to be performed on data and a first plurality of links representing flows of data among nodes in the first plurality of nodes;
   automatically generating, using the graph optimizer of the data processing system, an updated data structure embodying an updated dataflow graph, the updated dataflow graph comprising one or more input nodes representing the one or more data sources, one or more output nodes representing the one or more data sinks, and a second plurality of nodes representing a second plurality of data processing operations to be performed on data and a second plurality of links representing flows of data among nodes in the second plurality of nodes, wherein the second plurality of nodes includes a first node representing a first data processing operation executable by a first computer system process and a second node representing a second data processing operation executable by a second computer system process, wherein the second plurality of links includes a first link from the first node representing the first data processing operation to the second node representing the second data processing operation, the generating comprising using the graph optimizer to iteratively perform:
      i) determining, using a dataflow subgraph pattern matching language expression for identifying portions of dataflow graphs having commuting nodes, that an optimization rule is to be applied to a portion of the initial dataflow graph, wherein:
         the dataflow subgraph pattern matching language expression identifies: (1) a series of nodes, each of the nodes representing a respective data processing operation, and (2) a particular node in the series of nodes whose order in the series of nodes may be changed relative to one or more other nodes in the series of nodes without changing result of processing performed by data processing operations represented by the series of nodes,
         the dataflow subgraph pattern matching language expression identifies the particular node in the series of nodes with a symbol indicating that the order of the particular node may be changed relative to the one or more other nodes in the series of nodes without changing the result of processing performed by the data processing operations represented by the series of nodes, and
         the optimization rule is embodied in program code that, when executed, causes an optimization represented by the optimization rule to be performed on a dataflow graph, and
      ii) applying the optimization rule to the portion of the initial dataflow graph by executing the program code embodying the optimization rule; and
   executing, using the graph execution engine of the data processing system, the updated dataflow graph at least in part by:
      reading input data from the one or more data sources represented by the one or more input nodes,
      performing the second plurality of data processing operations on the input data, wherein performing the second plurality of data processing operations comprises executing the first data processing operation represented by the first node using the first computer system process and executing the second data processing operation represented by the second node linked to the first node via the first link using the second computer system process different from the first computer system process, and
      writing output data obtained as a result of performing the second plurality of data processing operations to the one or more data sinks represented by the one or more output nodes.

2. The at least one non-transitory computer-readable storage medium of claim 1, wherein the processor-executable instructions further cause the at least one computer hardware processor to perform:
   assigning a processing layout to each of one or more nodes of the updated dataflow graph, wherein the processing layout for a node representing a data processing operation specifies a number of computing devices to be used for performing the data processing operation.

3. The at least one non-transitory computer-readable storage medium of claim 2, wherein executing the updated dataflow graph is performed in accordance with the assigned one or more processing layouts.

4. The at least one non-transitory computer-readable storage medium of claim 1, wherein the second plurality of nodes has fewer nodes than the first plurality of nodes and the second plurality of links has fewer links that the first plurality of links.

5. The at least one non-transitory computer-readable storage medium of claim 1, wherein:
   the one or more input nodes comprise a first input node representing a first data source from which data records are to be read during execution and configured with one or more parameter values indicating how to access data records from the first data source,
   the one or more output nodes comprise a first output node representing a first data sink to which data records processed using one or more of the second plurality of data processing operations are to be written and configured with one or more parameter values indicated how to write data records to the first data sink, and source ends of links in the second plurality of links are coupled to respective output ports of nodes from which they originate and sink ends of the links are coupled to respective input ports of nodes at which they terminate.

6. The at least one non-transitory computer-readable storage medium of claim 1, wherein the processor-executable instructions further cause the at least one computer hardware processor to perform:

selecting the portion of the initial dataflow graph; and
selecting the optimization rule from a set of optimization rules stored in memory.

7. The at least one non-transitory computer-readable storage medium of claim 6, wherein selecting the optimization rule from the set of optimization rules further comprises:

selecting a first optimization rule during a first iteration of generating the updated data structure embodying the updated dataflow graph; and
selecting a second optimization rule different from the first optimization rule during a second iteration of generating the updated data structure embodying the updated dataflow graph.

8. The at least one non-transitory computer-readable storage medium of claim 6, wherein selecting the portion of the initial dataflow graph comprises:

selecting the portion of the initial dataflow graph before selecting the optimization rule, wherein selecting the optimization rule is performed using the portion of the initial dataflow graph.

9. The at least one non-transitory computer-readable storage medium of claim 6, wherein the processor-executable instructions further cause the at least one computer hardware processor to perform:

generating a topologically sorted graph by topologically sorting the initial dataflow graph; and
generating the updated data structure embodying the updated dataflow graph using the topologically sorted graph, wherein selecting the portion of the initial dataflow graph comprises traversing the topologically sorted graph to identify a portion of the topologically sorted graph to which to apply the optimization rule.

10. The at least one non-transitory computer-readable storage medium of claim 1, wherein:

a dataflow subgraph matching language includes expressions representing respective patterns to be identified in dataflow graphs.

11. The at least one non-transitory computer-readable storage medium of claim 1, wherein applying the optimization rule comprises applying an optimization selected from the group consisting of: removal of a redundant data processing operation, a strength reduction optimization, a combining operations optimization, a width reduction optimization, and a deduplication optimization.

12. The at least one non-transitory computer-readable storage medium of claim 1, wherein generating the updated data structure embodying the updated dataflow graph comprises identifying a node representing a redundant operation and removing the identified node from the initial dataflow graph.

13. The at least one non-transitory computer-readable storage medium of claim 1, wherein generating the updated data structure embodying the updated dataflow graph comprises identifying two nodes in the initial dataflow graph representing respective sort data processing operations and replacing the two nodes with a single node representing a sort data processing operation.

14. The at least one non-transitory computer-readable storage medium of claim 13, wherein the two nodes are not adjacent to each other in the initial dataflow graph.

15. The at least one non-transitory computer-readable storage medium of claim 1, wherein generating the updated data structure embodying the updated dataflow graph comprises replacing the first node representing the first data processing operation with a third node representing a third data processing operation of a weaker type than the first data processing operation.

16. The at least one non-transitory computer-readable storage medium of claim 1, wherein generating the updated data structure embodying the updated dataflow graph comprises identifying two nodes in the initial dataflow graph representing respective join data processing operations and replacing the two nodes with a single node representing a join data processing operation.

17. The at least one non-transitory computer-readable storage medium of claim 1, wherein applying the optimization rule to the portion of the initial dataflow graph comprises:

determining whether the optimization rule is applicable to the portion of the initial dataflow graph with the commuting nodes in a first order, and
when it is determined that the optimization rule is not applicable to the portion of the initial dataflow graph with the commuting nodes in the first order, applying the optimization rule to the portion of the initial dataflow graph with the commuting nodes in a second order, different than the first order.

18. The at least one non-transitory computer-readable storage medium of claim 1, wherein the processor-executable instructions further cause the at least one computer hardware processor to perform generating a query plan for the input SQL query; and
generating the initial data structure embodying the initial dataflow graph using the query plan.

19. A method, comprising:

using at least one computer hardware processor of a data processing system configured to read data from and/or write data to one or more data stores comprising one or more data sources and one or more data sinks and comprising a graph optimizer and a graph execution engine to perform:

obtaining an input structured query language (SQL) query or an input dataflow graph;
automatically generating, from the input SQL query or the input dataflow graph, an initial data structure embodying an initial dataflow graph, the initial dataflow graph comprising a first plurality of nodes representing a first plurality of data processing operations to be performed on data and a first plurality of links representing flows of data among nodes in the first plurality of nodes;
automatically generating, using the graph optimizer of the data processing system, an updated data structure embodying an updated dataflow graph, the updated dataflow graph comprising one or more input nodes representing the one or more data sources, one or more output nodes representing the one or more data sinks, and a second plurality of nodes representing a second plurality of data processing operations to be performed on data and a second plurality of links representing flows of data among nodes in the second plurality of nodes, wherein the second plurality of nodes includes a first node representing a first data processing operation executable by a first computer system process and a second node representing a second data processing operation executable by a second computer system process, wherein the second plurality of links includes a first link from the first node representing the first data processing operation to the second node representing the second data processing operation, the generating comprising using the graph optimizer to iteratively perform:

i) determining, using a dataflow subgraph pattern matching language expression for identifying portions of dataflow graphs having commuting nodes, that an optimization rule is to be applied to a portion of the initial dataflow graph, wherein:

the dataflow subgraph pattern matching language expression identifies: (1) a series of nodes, each of the nodes representing a respective data processing operation, and (2) a particular node in the series of nodes whose order in the series of nodes may be changed relative to one or more other nodes in the series of nodes without changing result of processing performed by data processing operations represented by the series of nodes, the dataflow subgraph pattern matching language expression identifies the particular node in the series of nodes with a symbol indicating that the order of the particular node may be changed relative to the one or more other nodes in the series of nodes without changing the result of processing performed by the data processing operations represented by the series of nodes, and the optimization rule is embodied in program code that, when executed, causes an optimization represented by the optimization rule to be performed on a dataflow graph, and ii) applying the optimization rule to the portion of the initial dataflow graph by executing the program code embodying the optimization rule; and executing, using the graph execution engine of the data processing system, the updated dataflow graph at least in part by:

reading input data from the one or more data sources represented by the one or more input nodes, performing the second plurality of data processing operations on the input data, wherein performing the second plurality of data processing operations comprises executing the first data processing operation represented by the first node using the first computer system process and executing the second data processing operation represented by the second node linked to the first node via the first link using the second computer system process different from the first computer system process, and writing output data obtained as a result of performing the second plurality of data processing operations to the one or more data sinks represented by the one or more output nodes.

20. The method of claim 19, further comprising:
assigning a processing layout to each of one or more nodes of the updated dataflow graph,
wherein the executing is performed in accordance with the assigned one or more processing layouts.

21. The method of claim 19, further comprising:
selecting the optimization rule from a plurality of optimization rules stored in memory, wherein selecting the optimization rule further comprises:
selecting a first optimization rule during a first iteration of generating the updated data structure embodying the updated dataflow graph; and
selecting a second optimization rule different from the first optimization rule during a second iteration of generating the updated data structure embodying the updated dataflow graph.

22. The method of claim 19, wherein applying the optimization rule comprises applying an optimization selected from the group consisting of: removal of a redundant data processing operation, a strength reduction optimization, a combining operations optimization, a width reduction optimization, and a deduplication optimization.

23. The method of claim 19, further comprising:
generating a query plan for the input SQL query; and
generating the initial data structure embodying the initial dataflow graph using the query plan.

24. A data processing system, comprising:
at least one computer hardware processor; and
at least one non-transitory computer-readable storage medium storing processor-executable instructions that, when executed by the at least one computer hardware processor of a data processing system configured to read data from and/or write data to one or more data stores comprising one or more data sources and one or more data sinks and comprising a graph optimizer and a graph execution engine, cause the at least one computer hardware processor to perform:

obtaining an input structured query language (SQL) query or an input dataflow graph;

automatically generating, from the input SQL query or the input dataflow graph, an initial data structure embodying an initial dataflow graph, the initial dataflow graph comprising a first plurality of nodes representing a first plurality of data processing operations to be performed on data and a first plurality of links representing flows of data among nodes in the first plurality of nodes;

automatically generating, using the graph optimizer of the data processing system, an updated data structure embodying an updated dataflow graph, the updated dataflow graph comprising one or more input nodes representing the one or more data sources, one or more output nodes representing the one or more data sinks, and a second plurality of nodes representing a second plurality of data processing operations and a second plurality of links representing flows of data among nodes in the second plurality of nodes, wherein the second plurality of nodes includes a first node representing a first data processing operation executable by a first computer system process and a second node representing a second data processing operation executable by a second computer process, wherein the second plurality of links includes a first link from the first node representing the first data processing operation to the second node representing the second data processing operation, the generating comprising using the graph optimizer to iteratively perform:

i) determining, using a dataflow subgraph pattern matching language expression for identifying portions of dataflow graphs having commuting nodes, that an optimization rule is to be applied to a portion of the initial dataflow graph, wherein:

the dataflow subgraph pattern matching language expression identifies: (1) a series of nodes, each of the nodes representing a respective data processing operation, and (2) a particular node in the series of nodes whose order in the series of nodes may be changed relative to one or more other nodes in the series of nodes without changing result of processing performed by data processing operations represented by the series of nodes, the dataflow subgraph pattern matching language expression identifies the particular node in the series of nodes with a symbol indicating that the order of the particular node may be changed relative to the one or more other nodes in the series of nodes without changing the result of processing performed by the data processing operations represented by the series of nodes, and the optimization rule is embodied in program code that, when executed, causes an optimization represented by the optimization rule to be performed on a dataflow graph, and ii) applying the optimization rule to the portion of the initial dataflow graph by executing the program code embodying the optimization rule; and executing, using the graph execution engine of the data processing system, the updated dataflow graph at least in part by:

reading input data from the one or more data sources represented by the one or more input nodes, performing the second plurality of data processing operations on the input data, wherein performing the second plurality of data processing operations comprises executing the first data processing operation represented by the first node using the first computer system process and executing the second data processing operation represented by the second node linked to the first node via the first link using the second computer system process different from the first computer system process, and writing output data obtained as a result of performing the second plurality of data processing operations to the one or more data sinks represented by the one or more output nodes.

25. The data processing system of claim 24, wherein the processor-executable instructions further cause the at least one computer hardware processor to perform:

assigning a processing layout to each of one or more nodes of the updated dataflow graph, wherein the executing is performed in accordance with the assigned one or more processing layouts.

26. The data processing system of claim 24, wherein the processor-executable instructions further cause the at least one computer hardware processor to perform:

selecting the optimization rule from a plurality of optimization rules, wherein selecting the optimization rule comprises:

selecting a first optimization rule during a first iteration of generating the updated data structure embodying the updated dataflow graph; and selecting a second optimization rule during a second iteration of generating the updated data structure embodying the updated dataflow graph.

27. The data processing system of claim 24, wherein applying the optimization rule comprises applying an optimization selected from the group consisting of:

removal of a redundant data processing operation, a strength reduction optimization, a combining operations optimization, a width reduction optimization, and a deduplication optimization.

28. At least one non-transitory computer-readable storage medium storing processor-executable instructions for execution by at least one hardware processor of a data processing system configured to read data from and/or write data to one or more data stores comprising one or more data sources and one or more data sinks, the processor executable instructions comprising:

means for obtaining an input structured query language (SQL) query or an input dataflow graph;

means for automatically generating, from the input SQL query or the input dataflow graph, an initial data structure embodying an the initial dataflow graph comprising a first plurality of nodes representing a first plurality of data processing operations to be performed on data and a first plurality of links representing flows of data among nodes in the first plurality of nodes;

means for automatically generating, with the data processing system, an updated data structure embodying an updated dataflow graph, the updated dataflow graph comprising one or more input nodes representing the one or more data sources, one or more output nodes representing the one or more data sinks, and a second plurality of nodes representing a second plurality of data processing operations and a second plurality of links representing flows of data among nodes in the second plurality of nodes, wherein the second plurality of nodes includes a first node representing a first data processing operation executable by a first computer system process and a second node representing a second data processing operation executable by a second computer system process, wherein the second plurality of links includes a first link from the first node representing the first data processing operation to the second node representing the second data processing operation, the generating comprising iteratively:

i) determining, using a dataflow subgraph pattern matching language expression for identifying portions of dataflow graphs having commuting nodes, that an optimization rule is to be applied to a portion of the initial dataflow graph, wherein:

the dataflow subgraph pattern matching language expression identifies: (1) a series of nodes, each of the nodes representing a respective data processing operation, and (2) a particular node in the series of nodes whose order in the series of nodes may be changed relative to one or more other nodes in the series of nodes without changing result of processing performed by data processing operations represented by the series of nodes, the dataflow subgraph pattern matching language expression identifies the particular node in the series of nodes with a symbol indicating that the order of the particular node may be changed relative to the one or more other nodes in the series of nodes without changing the result of processing performed by the data processing operations represented by the series of nodes, and the optimization rule is embodied in program code that, when executed, causes an optimization represented by the optimization rule to be performed on a dataflow graph, and ii) applying the optimization rule to the portion of the initial dataflow graph by executing the program code embodying the optimization rule; and means for executing, with the data processing system, the updated dataflow graph at least in part by:

reading input data from the one or more data sources represented by the one or more input nodes, performing the second plurality of data processing operations on the input data, wherein performing the second plurality of data processing operations comprises executing the first data processing operation represented by the first node using the first computer system process and executing the second data processing operation represented by the second node linked to the first node via the first link using a second computer system process different from the first computer system process, and writing output data obtained as a result of performing the second plurality of data processing operations to the one or more data sinks represented by the one or more output nodes.

29. At least one non-transitory computer-readable storage medium storing processor-executable instructions that, when executed by at least one computer hardware processor of a data processing system configured to read data from and/or write data to one or more data stores comprising one or more data sources and one or more data sinks and comprising a graph optimizer and a graph execution engine, cause the at least one computer hardware processor to perform:

obtaining an input structured query language (SQL) query or an input dataflow graph;

automatically generating, using the input SQL query or the input dataflow graph, an initial data structure embodying an initial dataflow graph, the initial dataflow graph comprising a first plurality of nodes representing a first plurality of data processing operations and a first plurality of links representing flows of data among nodes in the first plurality of nodes;

automatically generating, using the graph optimizer of the data processing system, an updated data structure embodying an updated dataflow graph by iteratively applying dataflow graph optimization rules to update the initial dataflow graph, the updated dataflow graph comprising one or more input nodes representing the one or more data sources, one or more output nodes representing the one or more data sinks, and a second plurality of nodes representing a second plurality of data processing operations and a second plurality of links representing flows of data among nodes in the second plurality of nodes, wherein the second plurality of nodes includes a first node representing a first data processing operation and a second node representing a second data processing operation, wherein the second plurality of links includes a first link from the first node representing the first data processing operation to the second node representing the second data processing operation, the generating comprising:

identifying commuting nodes within a portion of the initial dataflow graph by using a dataflow subgraph pattern matching language expression for identifying portions of dataflow graphs having commuting nodes, wherein:

the dataflow subgraph pattern matching language expression identifies: (1) a series of nodes, each of the nodes representing a respective data processing operation, and (2) a particular node in the series of nodes whose order in the series of nodes may be changed relative to one or more other nodes in the series of nodes without changing result of processing performed by data processing operations represented by the series of nodes, and the dataflow subgraph pattern matching language expression identifies the particular node in the series of nodes with a symbol indicating that the order of the particular node may be changed relative to the one or more other nodes in the series of nodes without changing the result of processing performed by the data processing operations represented by the series of nodes;

determining whether an optimization rule is applicable to the portion of the initial dataflow graph with the commuting nodes in a first order, wherein the optimization rule is embodied in program code that, when executed, causes an optimization represented by the optimization rule to be performed on a dataflow graph;

when it is determined that the optimization rule is not applicable to the portion of the initial dataflow graph with the commuting nodes in the first order, determining whether the optimization rule is applicable to the portion of the initial dataflow graph with the commuting nodes in a second order, different from the first order; and when it is determined that the optimization rule is applicable to the portion of the initial dataflow graph with the commuting nodes in the second order, applying the optimization rule to the portion of the initial dataflow graph with the commuting nodes in the second order by executing the program code embodying the optimization rule; and executing, using the graph execution engine of the data processing system, the updated dataflow graph, wherein executing the updated dataflow graph comprises:

reading input data from the one or more data sources represented by the one or more input nodes, performing the second plurality of data processing operations on the input data, wherein performing the second plurality of data processing operations comprises executing the first data processing operation represented by the first node using a first computer system process and executing the second data processing operation represented by the second node linked to the first node via the first link using a second computer system process different from the first computer system process, and writing output data obtained as a result of performing the second plurality of data processing operations to the one or more data sinks represented by the one or more output nodes.

30. The at least one non-transitory computer-readable storage medium of claim 29, wherein the processor-executable instructions further cause the at least one computer hardware processor to perform:

assigning a processing layout to each of one or more nodes of the updated dataflow graph, wherein the executing is performed in accordance with the assigned one or more processing layouts.

31. The at least one non-transitory computer-readable storage medium of claim 29, wherein applying the optimization rule comprises applying an optimization selected from the group consisting of: removal of a redundant data processing operation, a strength reduction optimization, a combining operations optimization, a width reduction optimization, and a deduplication optimization.

32. The at least one non-transitory computer-readable storage medium of claim 29, wherein the processor-executable instructions further cause at least one computer hardware processor to perform:
generating a query plan for the input SQL query; and
generating the initial dataflow graph using the query plan.

33. At least one non-transitory computer-readable storage medium storing processor-executable instructions that, when executed by at least one computer hardware processor of a data processing system configured to read data from and/or write data to one or more data stores comprising one or more data sources and one or more data sinks and comprising a graph optimizer and a graph execution engine, cause the at least one computer hardware processor to perform:
obtaining an input structured query language (SQL) query or an input dataflow graph;
automatically generating, from the input SQL query or the input dataflow graph, an initial data structure embodying an initial dataflow graph, the initial dataflow graph comprising a first plurality of nodes representing a first plurality of data processing operations and a first plurality of links representing flows of data among nodes in the first plurality of nodes;
automatically generating, using the graph optimizer of the data processing system, an updated dataflow graph, the updated dataflow graph comprising one or more input nodes representing the one or more data sources, one or more output nodes representing the one or more data sinks, and a second plurality of nodes representing a second plurality of data processing operations and a second plurality of links representing flows of data among nodes in the second plurality of nodes, wherein the second plurality of nodes includes a first node representing a first data processing operation executable by a first computer system process and a second node representing a second data processing operation executable by a second computer system process, wherein the second plurality of links includes a first link from the first node representing the first data processing operation to the second node representing the second data processing operation, the generating comprising using the graph optimizer to iteratively perform:
i) determining, using a dataflow subgraph pattern matching language expression for identifying portions of dataflow graphs having commuting nodes, that an optimization rule is to be applied to a portion of the initial dataflow graph, wherein:
the dataflow subgraph pattern matching language expression identifies: (1) a series of nodes, each of the nodes representing a respective data processing operation, and (2) a particular node in the series of nodes whose order in the series of nodes may be changed relative to one or more other nodes in the series of nodes without changing result of processing performed by data processing operations represented by the series of nodes,
the dataflow subgraph pattern matching language expression identifies the particular node in the series of nodes with a symbol indicating that the order of the particular node may be changed relative to the one or more other nodes in the series of nodes without changing the result of processing performed by the data processing operations represented by the series of nodes, and
the optimization rule is embodied in program code that, when executed, causes an optimization represented by the optimization rule to be performed on a dataflow graph, and the optimization rule includes at least one a removal of a redundant data processing operation, a strength reduction optimization, a width reduction optimization, and a deduplication optimization; and
ii) applying the optimization rule to the portion of the initial dataflow graph by executing the program code embodying the optimization rule; and
executing, using the graph execution engine of the data processing system, the updated dataflow graph, wherein executing the updated dataflow graph comprises:
reading input data from the one or more data sources represented by the one or more input nodes,
performing the second plurality of data processing operations on the input data, wherein performing the second plurality of data processing operations comprises executing the first data processing operation represented by the first node using the first computer system process and executing the second data processing operation represented by the second node linked to the first node via the first link using the second computer system process different from the first computer system process; and
writing the output data obtained as a result of performing the second plurality of data processing operations to the one or more data sinks represented by the one or more output nodes.

34. The at least one non-transitory computer-readable storage medium of claim 33, wherein the processor-executable instructions further cause the at least one computer hardware processor to perform:
assigning a processing layout to each of one or more nodes of the updated dataflow graph,
wherein the executing is performed in accordance with the assigned one or more processing layouts.

35. The at least one non-transitory computer-readable storage medium of claim 33, wherein the optimization rule comprises the width reduction optimization, and
wherein applying the optimization rule to the portion of the initial dataflow graph comprises deleting at least some data that is not used by one or more data processing operations of the first plurality of data processing operations.

36. The at least one non-transitory computer-readable storage medium of claim 33, wherein the optimization rule comprises the strength reduction optimization, and
wherein applying the optimization rule to the portion of the initial dataflow graph comprises replacing a third node of the first plurality of nodes representing a third data processing operation with a fourth node of the first plurality of nodes representing a fourth data processing operation, wherein the fourth data processing operation performs fewer computations on data than the third data processing operation.

* * * * *